United States Patent
Tzou et al.

(10) Patent No.: US 10,915,163 B2
(45) Date of Patent: Feb. 9, 2021

(54) ELECTRONIC DEVICE, HINGE ASSEMBLY AND AUGMENTED REALITY INTERACTION PROCESS FOR ELECTRONIC DEVICE

(71) Applicants: Jyh-Chyang Tzou, Taipei (TW); Yao-Hsien Yang, Taipei (TW); Yi-Hsun Liu, Taipei (TW); Hsiao-Wen Tseng, Taipei (TW); Cheng-Ya Chi, Taipei (TW)

(72) Inventors: Jyh-Chyang Tzou, Taipei (TW); Yao-Hsien Yang, Taipei (TW); Yi-Hsun Liu, Taipei (TW); Hsiao-Wen Tseng, Taipei (TW); Cheng-Ya Chi, Taipei (TW)

(73) Assignee: COMPAL ELECTRONICS, INC., Taipei (TW)

( * ) Notice: Subject to any disclaimer, the term of this patent is extended or adjusted under 35 U.S.C. 154(b) by 0 days.

(21) Appl. No.: 16/237,751

(22) Filed: Jan. 2, 2019

(65) Prior Publication Data
US 2019/0212809 A1     Jul. 11, 2019

Related U.S. Application Data

(60) Provisional application No. 62/670,853, filed on May 13, 2018, provisional application No. 62/627,153, (Continued)

(51) Int. Cl.
*G06F 3/038* (2013.01)
*G06F 3/041* (2006.01)
(Continued)

(52) U.S. Cl.
CPC .............. *G06F 3/011* (2013.01); *E05D 11/00* (2013.01); *F16C 11/04* (2013.01); *G06F 1/1618* (2013.01);
(Continued)

(58) Field of Classification Search
CPC ....... E05D 11/00; E05D 11/1028; E05D 3/06; E05Y 2900/606; F16C 11/04;
(Continued)

(56) References Cited

U.S. PATENT DOCUMENTS 5,898,600 A     4/1999  Isashi
7,509,348 B2    3/2009  Burtner et al.
(Continued)

FOREIGN PATENT DOCUMENTS

CN      104806627       7/2015
CN      206331381       7/2017
(Continued)

OTHER PUBLICATIONS

"Office Action of Taiwan Counterpart Application", dated May 8, 2020, p. 1-p. 8.

*Primary Examiner* — Afroza Chowdhury
(74) *Attorney, Agent, or Firm* — JCIPRNET

(57) ABSTRACT

The invention provides an electronic device, a hinge assembly, and an AR interaction process for an electronic device. The electronic device includes a first body, a second body, a hinge assembly, and a rotatable camera. The hinge assembly includes a first hinge, a second hinge, a third hinge, and an L-shaped hinge. The L-shaped hinge has a first segment and a second segment. The first segment is pivotally connected to the first body through the first hinge, the second segment is pivotally connected to the second body through the second hinge, and the first hinge, the second hinge, and the third hinge are parallel to each other and are not coaxial with each other. In addition, the rotatable camera is assembled to the second segment.

42 Claims, 25 Drawing Sheets

Related U.S. Application Data filed on Feb. 6, 2018, provisional application No. 62/613,031, filed on Jan. 2, 2018.

(51) Int. Cl.

| | | |
|---|---|---|
| *G06F 3/02* | (2006.01) | |
| *G06F 1/16* | (2006.01) | |
| *E05D 3/06* | (2006.01) | |
| *F16C 11/04* | (2006.01) | |
| *E05D 11/10* | (2006.01) | |
| *E05D 11/00* | (2006.01) | |
| *G06F 3/01* | (2006.01) | |
| *G06F 3/0354* | (2013.01) | |

(52) U.S. Cl.
CPC .......... *G06F 1/1681* (2013.01); *G06F 1/1686* (2013.01); *G06F 3/0202* (2013.01); *G06F 3/0383* (2013.01); *G06F 3/03545* (2013.01); *G06F 3/0416* (2013.01); *E05D 3/06* (2013.01); *E05D 11/1028* (2013.01); *E05Y 2900/606* (2013.01); *G06F 1/1616* (2013.01); *G06F 2203/0384* (2013.01)

(58) Field of Classification Search
CPC .... G06F 1/1616; G06F 1/1618; G06F 1/1681; G06F 1/1686; G06F 2203/0384; G06F 3/011; G06F 3/0202; G06F 3/03545; G06F 3/0383; G06F 3/0416
See application file for complete search history.

(56) References Cited

U.S. PATENT DOCUMENTS

| | | | |
|---|---|---|---|
| 9,395,862 | B2 | 7/2016 | Kim |
| 10,013,031 | B2* | 7/2018 | Knepper ................. E05D 11/00 |
| 2003/0125094 | A1* | 7/2003 | Hyun .................. H04M 1/0216 |
| | | | 455/566 |
| 2011/0239408 | A1* | 10/2011 | Chang .................. G06F 1/1681 |
| | | | 16/386 |
| 2014/0359508 | A1 | 12/2014 | Otero Diaz et al. |
| 2016/0246335 | A1* | 8/2016 | Senatori .................. G06F 1/162 |
| 2017/0344074 | A1* | 11/2017 | Sprenger ............... G06F 1/1616 |
| 2018/0095504 | A1* | 4/2018 | Knepper ............... G06F 1/1681 |
| 2018/0292866 | A1* | 10/2018 | Tucker ................. G06F 1/1686 |

FOREIGN PATENT DOCUMENTS

| | | |
|---|---|---|
| TW | I459246 | 11/2014 |
| TW | I493394 | 7/2015 |
| TW | I502949 | 10/2015 |

\* cited by examiner

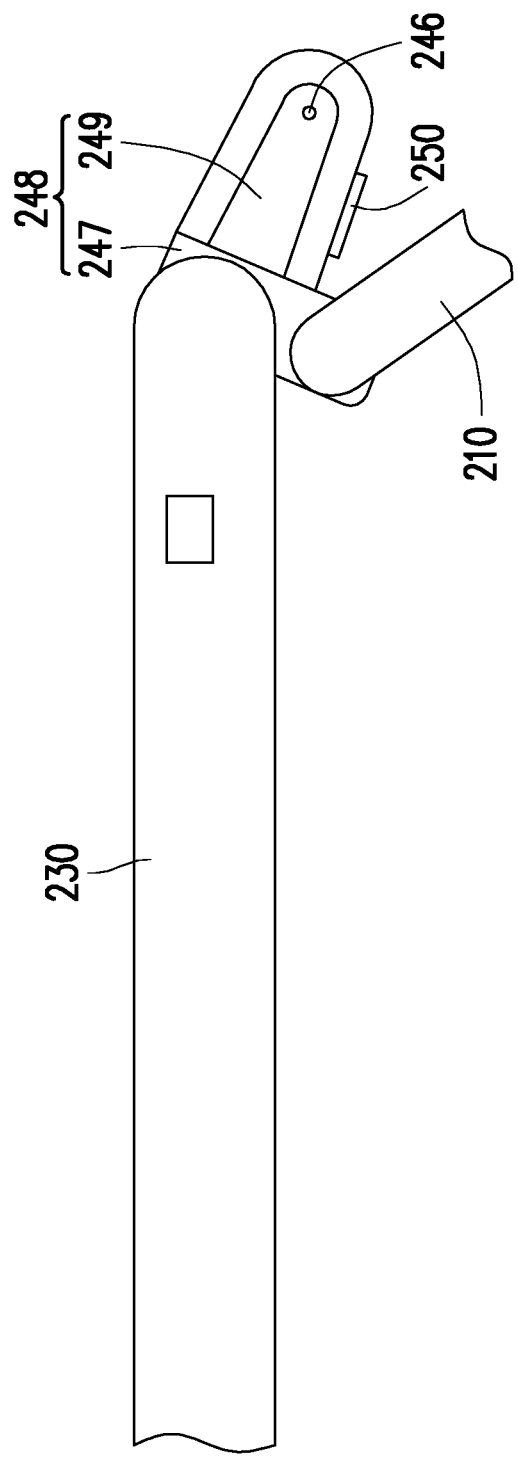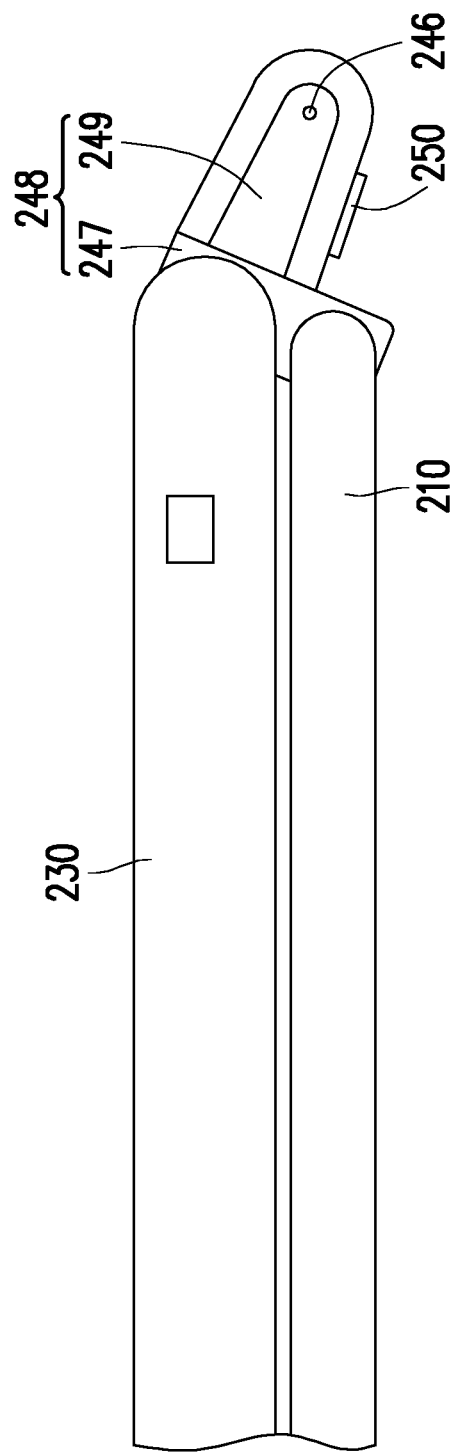

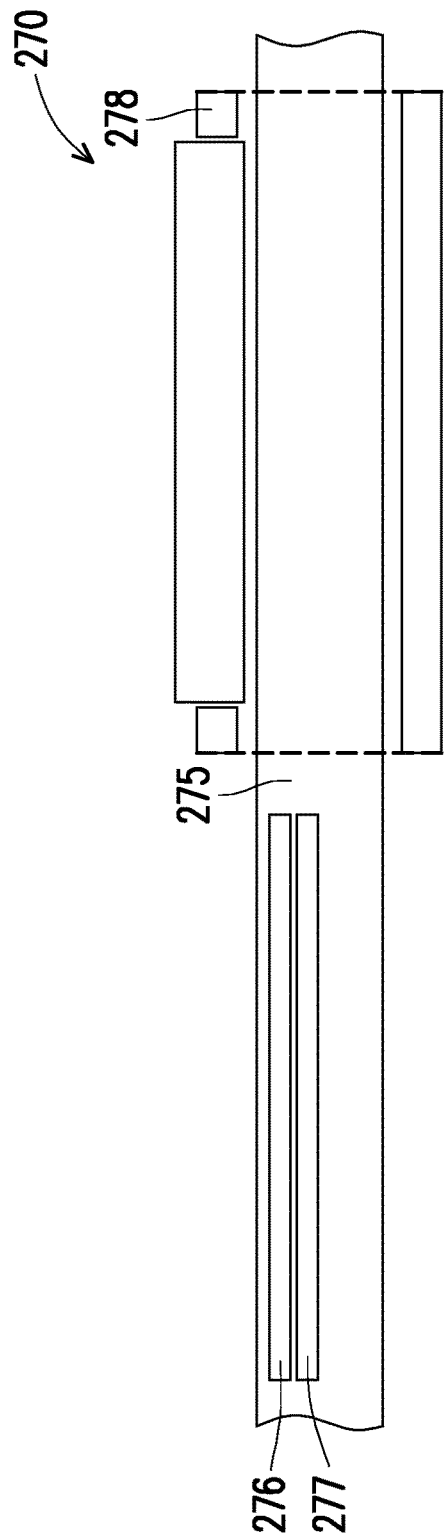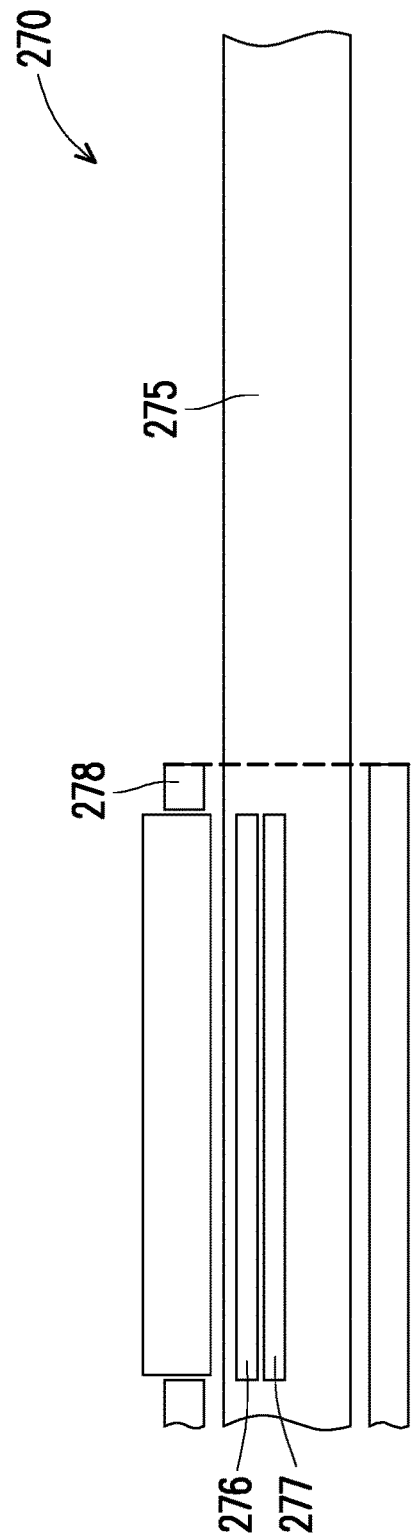

ELECTRONIC DEVICE, HINGE ASSEMBLY AND AUGMENTED REALITY INTERACTION PROCESS FOR ELECTRONIC DEVICE

CROSS-REFERENCE TO RELATED APPLICATION

This application claims the priority benefits of U.S. provisional application Ser. No. 62/613,031, filed on Jan. 2, 2018, U.S. provisional application Ser. No. 62/627,153, filed on Feb. 6, 2018, and U.S. provisional application Ser. No. 62/670,853, filed on May 13, 2018. The entirety of each of the above-mentioned patent applications is hereby incorporated by reference herein and made a part of specification.

BACKGROUND OF THE INVENTION

1. Field of the Invention

The invention relates to an electronic device, and particularly relates to an electronic device that is convenient to use, a hinge assembly applicable to the electronic device, and an augmented reality interaction process of the electronic device.

2. Description of Related Art

FIG. 1 shows a state of use where a conventional notebook computer runs augmented reality (AR). Referring to FIG. 1, since an embedded lens 110 of a conventional notebook computer 100 is normally disposed on an upper frame of a display 120, a shooting angle and a shooting range of the lens 110 are limited.

Also, when the user views the screen, the angle at which the display 120 is opened is perpendicular to the shooting angle of the lens 110. Therefore, to allow the lens to shoot a marker 130, the angle of the display 120 needs to be reduced. In such a case, the angle is not an angle set for the user to view the screen normally and may therefore cause inconvenience of the user.

SUMMARY OF THE INVENTION

The invention provides an electronic device that is convenient to use.

The invention provides a hinge assembly applicable to the electronic device.

The invention provides an augmented reality (AR) interaction process for an electronic device.

The electronic device of the invention includes a first body, a second body, a hinge assembly, and a rotatable camera. The hinge assembly includes a first hinge, a second hinge, a third hinge, and an L-shaped hinge. The L-shaped hinge has a first segment and a second segment. The first segment is pivotally connected to the first body through the first hinge, the second segment is pivotally connected to the second body through the second hinge, and the first hinge, the second hinge, and the third hinge are parallel to each other and are not coaxial with each other. The rotatable camera is assembled to the second segment.

According to an embodiment of the invention, a first accommodating groove is formed in the first body and the second device to accommodate the L-shaped hinge.

According to an embodiment of the invention, when a range of an angle at which the first body being flipped with respect to the second body is 0 degrees to 180 degrees, the L-shaped hinge is rotated simultaneously with the first body.

According to an embodiment of the invention, when a range of an angle at which the first body being flipped with respect to the second body is 180 degrees to 360 degrees, the L-shaped hinge is fixed with the second body and unmoved relative to the second body.

According to an embodiment of the invention, when an angle at which the first body being flipped with respect to the second body is less than or equal to a first predetermined angle, the L-shaped hinge is fixed with the second body and unmoved relative to the second body.

According to an embodiment of the invention, when the angle at which the first body being flipped with respect to the second body is greater than the first predetermined angle, the L-shaped hinge is moved simultaneously with the first body.

According to an embodiment of the invention, the first predetermined angle is between 130 degrees and 160 degrees.

According to an embodiment of the invention, a range of an angle at which the first body being flipped with respect to the second body is 0 degrees to 360 degrees.

According to an embodiment of the invention, the rotatable camera rotates around the third hinge as an axis of rotation with respect to the second segment, or the rotatable camera rotates around a direction perpendicular to the third hinge as an axis of rotation with respect to the second segment.

A hinge assembly according to the invention includes a first hinge, a second hinge, and a third hinge; an L-shaped hinge, having a first segment and a second segment, wherein the first segment is pivotally connected to a first body through the first hinge, and the second segment is pivotally connected to a second body through the second hinge; and a rotatable camera, pivotally connected to the second segment through the third hinge, wherein the first hinge, the second hinge, and the third hinge are parallel to each other and not coaxial with each other.

According to an embodiment of the invention, an extending direction of the first segment is perpendicular to an extending direction of the second segment.

According to an embodiment of the invention, the second segment has a second accommodating groove, and the rotatable camera is accommodated in the second accommodating groove.

According to an embodiment of the invention, the second segment has a fixing part, and the rotatable camera is detachably assembled to the fixing part.

According to an embodiment of the invention, the third hinge has an outer thread, the fixing part has an inner thread, and the inner thread and the outer thread match each other.

According to an embodiment of the invention, the third hinge has an inner recess, the fixing part has an engaging block, and the engaging block and the inner recess are in proper shapes to be engaged with each other.

According to an embodiment of the invention, the fixing part has a sidewall surrounding the engaging block. In addition, an annular block is disposed on the sidewall, and the annular block and the annular recess are suitable to be engaged with each other.

According to an embodiment of the invention, the third hinge has a first slot, the fixing part is provided with a first hook, and the first hook is suitable to be latched to the first slot.

According to an embodiment of the invention, the hinge assembly further includes a first magnet disposed at the fixing part, and the third hinge is magnetic to be attracted to the first magnet.

According to an embodiment of the invention, the hinge assembly further includes a second magnet disposed at the third hinge, so that the second magnet and the first magnet are attracted to each other.

According to an embodiment of the invention, the third hinge is formed on a first side of the rotatable camera.

According to an embodiment of the invention, the hinge assembly further includes a touch pen detachably assembled on a second side of the rotatable lens, and the touch pen has a pen tip end and a pen rear end on opposite two sides.

According to an embodiment of the invention, a tapered recess is provided on the second side, and the pen tip end is correspondingly fit into the tapered recess.

According to an embodiment of the invention, the pen rear end of the touch pen has a second slot, the second accommodating groove is provided with a second hook, and the second hook is suitable to be latched into the second slot.

According to an embodiment of the invention, the pen rear end of the touch pen has a rough surface.

According to an embodiment of the invention, the pen tip end of the touch pen has a positioning protruding ring disposed along a circumferential direction of the touch pen, the tapered recess is provided with a positioning recessed ring correspondingly, and the positioning protruding ring is correspondingly fit into the positioning recessed ring.

According to an embodiment of the invention, the pen tip end of the touch pen has a positioning rib disposed along a radial direction of the touch pen, the tapered recess is provided with a positioning recess correspondingly, and the positioning rib is correspondingly fit into the positioning recess.

According to an embodiment of the invention, the second accommodating groove further includes a plurality of support rings for supporting the touch pen.

According to an embodiment of the invention, the touch pen includes a touch sensor and a pressure sensor. The touch sensor is disposed inside a pen body to sense an axial input along an axial direction of the touch pen. The pressure sensor is disposed inside a pen body to sense a radial input along a radial direction of the touch pen.

According to an embodiment of the invention, the pressure sensor and the touch sensor are disposed to be stacked.

According to an embodiment of the invention, the touch pen includes a slidable tube sleeved on the pen body.

According to an embodiment of the invention, when the touch pen is inserted into an external electronic device, the slidable tube slides to a position at the pen tip end or a position at the pen rear end.

According to an embodiment of the invention, when the touch pen is retrieved from the external electronic device, the slidable tube slides to a position corresponding to the touch sensor or corresponding to the pressure sensor.

According to an embodiment of the invention, the touch pen includes a wireless communicating element disposed inside the pen body and serving for wireless communication with another external electronic device.

According to an embodiment of the invention, when the touch sensor senses axial inputs twice and the pressure sensor senses radial inputs twice, the wireless communicating element generates a command for turning on an user interface or a command for turning off the user interface, and transmits the generated command to the another external electronic device.

According to an embodiment of the invention, when the touch sensor senses an axial input toward the pen rear end and the pressure sensor senses a continuous radial input, the wireless communicating element generates a command for sliding down in an user interface or a command for moving up a choice in the user interface and transmits the generated command to the another external electronic device.

According to an embodiment of the invention, when the touch sensor senses an axial input toward the pen tip end and the pressure sensor senses a continuous radial input, the wireless communicating element generates a command for sliding up in an user interface or a command for moving down a choice in the user interface and transmits the generated command to the another external electronic device.

According to an embodiment of the invention, when the touch sensor senses the axial input once and the pressure sensor senses the radial input once, the wireless communicating element generates a command for confirmation and transmits the generated command to the another external electronic device.

According to an embodiment of the invention, when the touch sensor senses no axial input and the pressure sensor senses a continuous radial input, the wireless communicating element generates a command for drawing a line and transmits the generated command to the another external electronic device.

According to an embodiment of the invention, the command for drawing a line includes a command on line thickness, and the command on line thickness is positively proportional to a magnitude of a value of the sensed continuous radial input.

According to an embodiment of the invention, when the another external electronic device is a head-mounted electronic device, the command for drawing a line is a command for drawing a spatial line.

According to an embodiment of the invention, the another external electronic device includes an augmented reality device, a virtual reality device, or a mixed reality device.

An augmented reality (AR) interaction process for an electronic device at least includes the following: providing an electronic device including a first hinge, the hinge assembly according to the above, and a second body pivotally connected with each other, wherein the first body has a touch display panel, and the second body has a keyboard; enabling an input function of the touch display panel and an input function of the keyboard; sensing and determining whether an angle at which the first body being flipped with respect the second body is greater than 180 degrees and less than or equal to 360 degrees; turning off the input function of the keyboard if the angle at which the first body being flipped is greater than 180 degrees and less than or equal to 360 degrees; and executing a default AR program and enabling a shooting function of the rotatable camera.

According to an embodiment of the invention, the AR interaction process further includes: sensing and determining whether an external marker is present within a shooting range of the rotatable camera; instructing the rotatable camera to generate a first trigger image and displaying the first trigger image on the touch display panel, if the external marker is present within the shooting range of the rotatable camera; generating a first trigger command according to the first trigger image; and instructing the touch display panel to display a virtual object according to the first trigger command, wherein the virtual object is overlapped or partially overlapped with the first trigger image.

According to an embodiment of the invention, the first body includes a fixed lens.

According to an embodiment of the invention, the fixed lens or the rotatable camera generates a second trigger image.

According to an embodiment of the invention, the first body or the second body includes a speaker.

According to an embodiment of the invention, when the second trigger image is determined as an image in which a hand covers an ear, a volume of the speaker is turned down.

According to an embodiment of the invention, when the second trigger image is determined as an image in which a hand is placed behind an ear, a volume of the speaker is turned up.

According to an embodiment of the invention, the first body or the second body includes a sound receiver.

According to an embodiment of the invention, when the second trigger image is determined as an image in which a finger is placed on lips, the sound receiver is disabled. Based on the above, the electronic device of the invention touches upon the limitation on the shooting angle of the lens disposed at the first body in the scenario of AR. Moreover, since the rotatable camera may be detached from the body based on the needs, the user may move the rotatable camera during use thereof.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

FIGS. 7A to 7D are schematic view illustrating that the first body of the electronic device is rotated with respect to the second body according to another embodiment.

FIG. 8A illustrates a clamshell mode, FIGS. 8B to 8E illustrate a tent mode, and FIGS. 8F and 8G illustrate a tablet mode.

FIG. 16A is a schematic view illustrating that a slidable tube moves toward a pen rear end.

FIG. 16B is a schematic view illustrating that the slidable tube slides to a position corresponding to a touch sensor and a pressure sensor.

DESCRIPTION OF THE EMBODIMENTS

Figure 1:
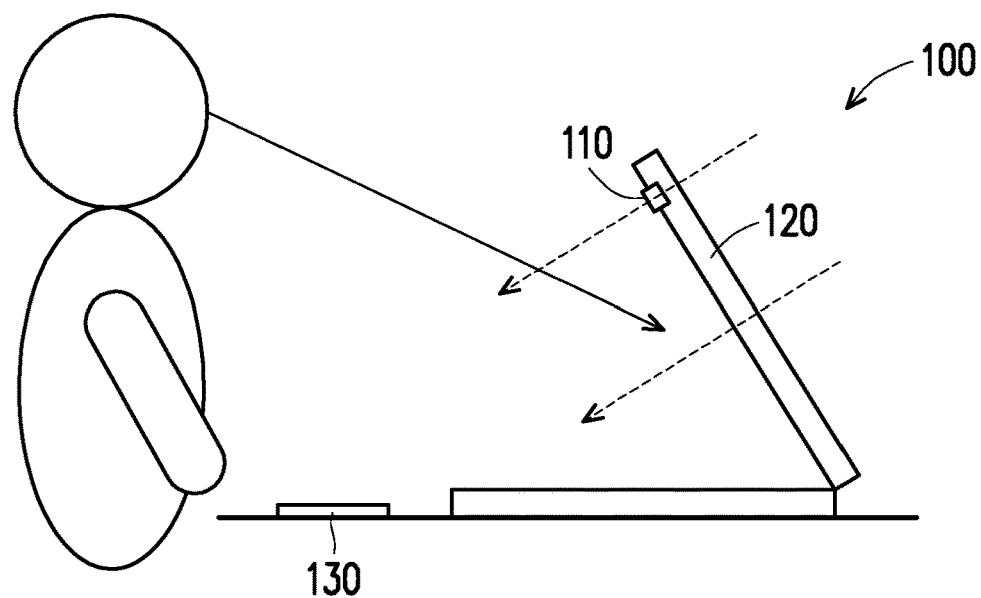
FIG. 1 shows a state of use where a conventional notebook computer runs augmented reality (AR).
Figure 2:
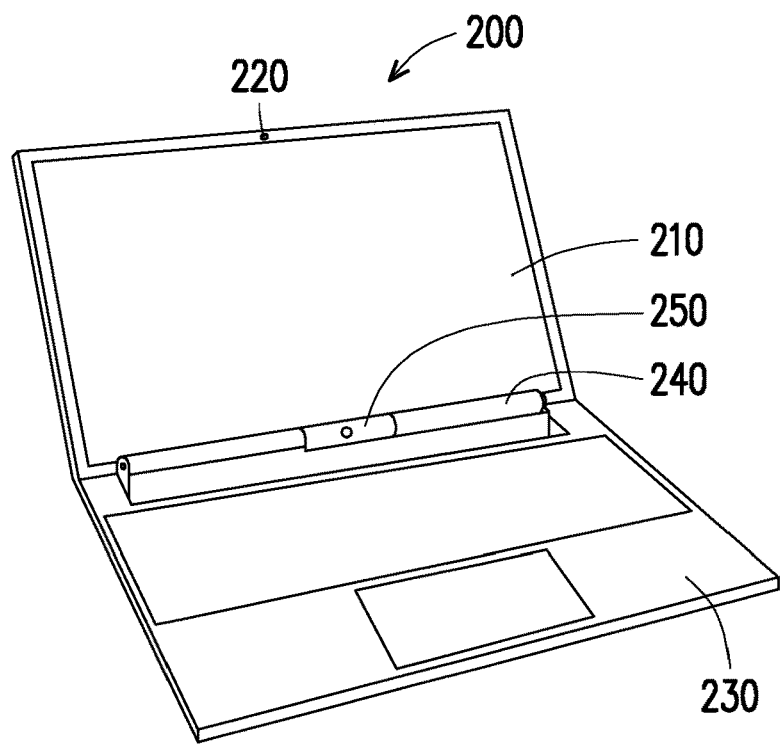
FIG. 2 is a schematic perspective view illustrating an electronic device according to an embodiment of the invention.
Figure 3:
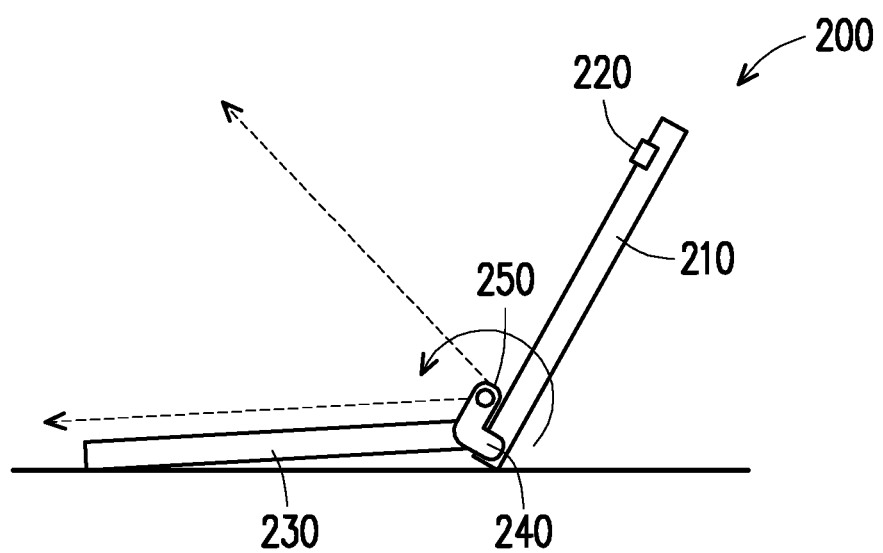
FIG. 3 is a side view of the electronic device of FIG. 2.
Figure 4:
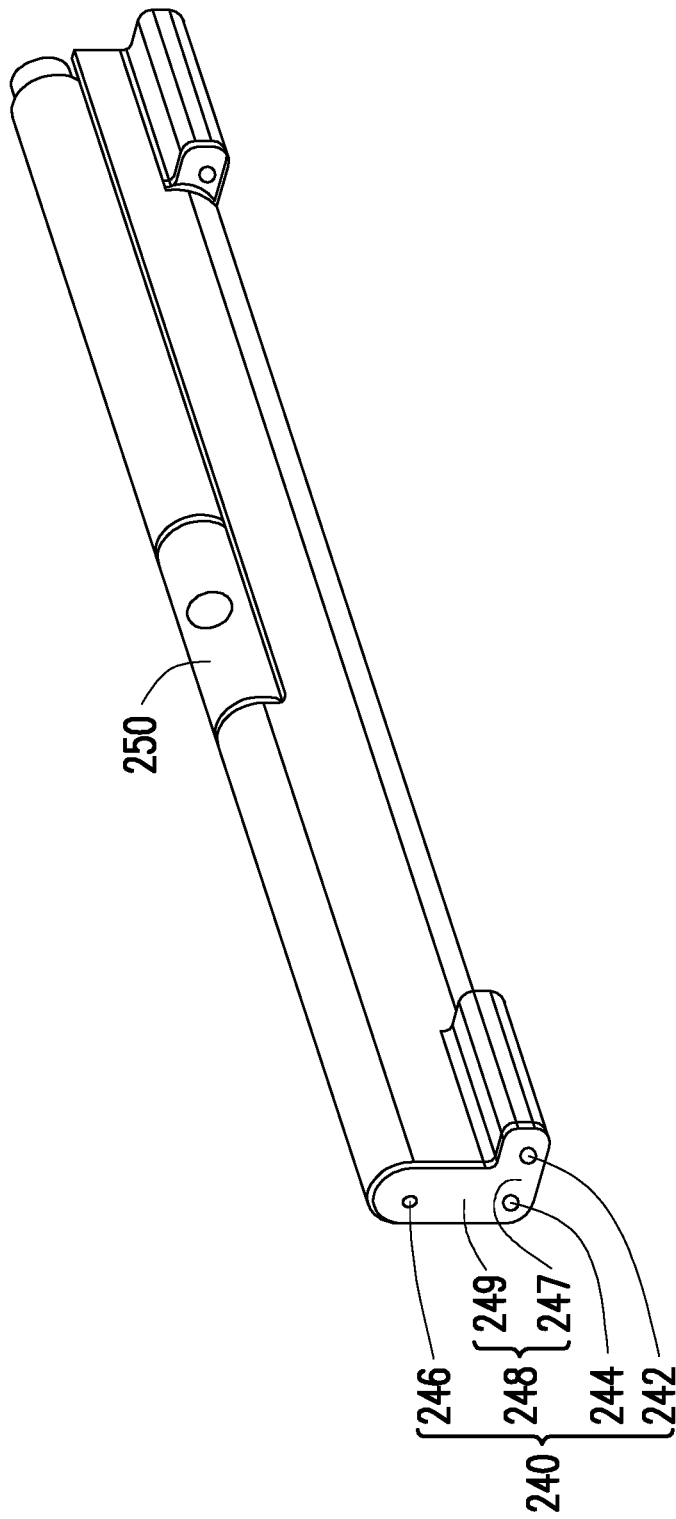
FIG. 4 is a schematic view illustrating an L-shaped hinge and a rotatable camera of the electronic device of FIG. 2.

FIG. 2 is a schematic perspective view illustrating an electronic device according to an embodiment of the invention, FIG. 3 is a side view of the electronic device of FIG. 2, and FIG. 4 is a schematic view illustrating an L-shaped hinge and a rotatable camera of the electronic device of FIG. 2. Referring to FIGS. 2, 3, and 4 together, an electronic device 200 is a notebook computer, for example, and includes a first body 210, a fixed lens 220, a second body 230, a hinge assembly 240, and a rotatable camera 250. The first body 210 may be a display, and includes a touch display panel. The second body 230 may be a computer main body, and includes a keyboard (not shown). The fixed lens 220 is disposed on the first body 210, and the hinge assembly 240 is connected between the first body 210 and the second body 230, so that the first body 210 and the second body 230 are able to be open and closed with respect to each other. The hinge assembly 240 includes a first hinge 242, a second hinge 244, a third hinge 246, and an L-shaped hinge 248. The L-shaped hinge 248 has a first segment 247 and a second segment 249. In addition, an extending direction of the first segment 247 is perpendicular to an extending direction of the second segment 249. The first segment 247 is pivotally connected to the first body 210 through the first hinge 242, and the second segment 249 is pivotally connected to the second body 230 through the second hinge 244, so that the second body 230 is able to be open and closed with respect to the first body 210. The first hinge 242, the second hinge 244, and the third hinge 246 are parallel to each other and are not coaxial to each other. The rotatable camera 250 is assembled to the second segment 249.

Figure 5:
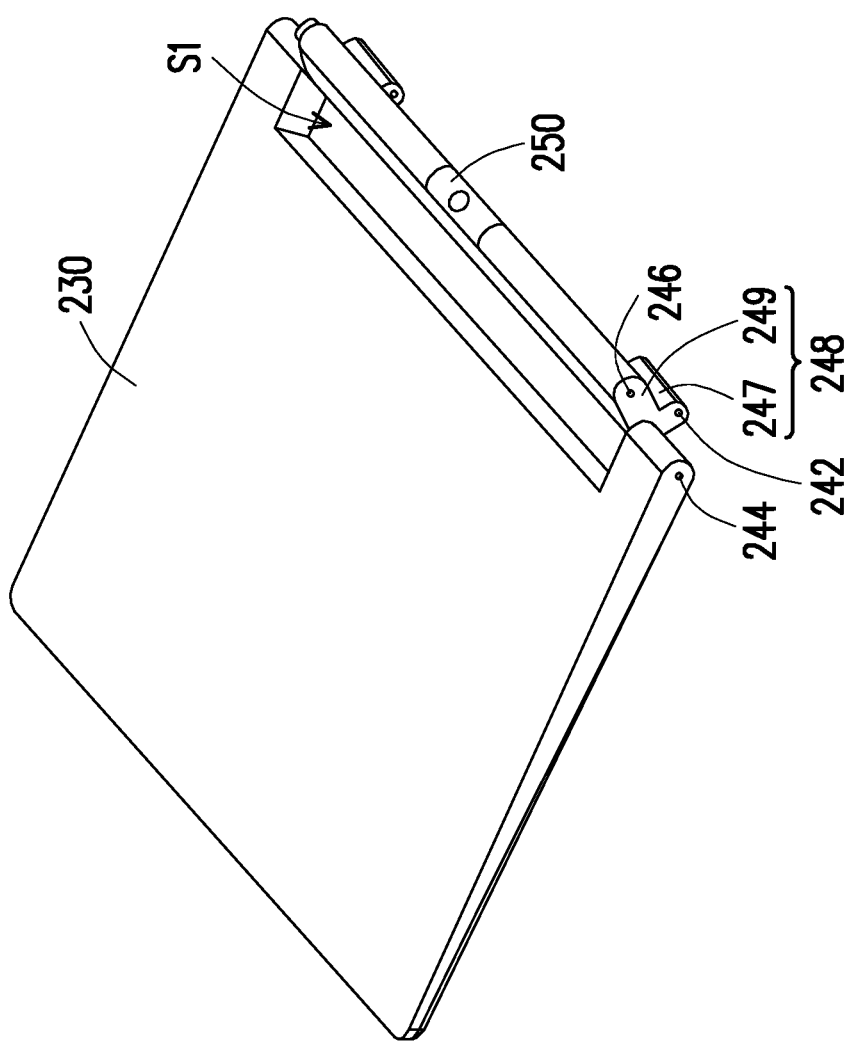
FIG. 5 is a schematic view illustrating the electronic device from another perspective.

FIG. 5 is a schematic view illustrating the electronic device from another perspective. Referring to FIGS. 3 and 5 together, an accommodating groove S1 is formed in the first body 210 and the second body 230 to accommodate the L-shaped hinge 248. In addition, a range of an angle at which the first body 210 is able to flip with respect to the second body 230 is from 0 degrees to 360 degrees.

Figure 8A:
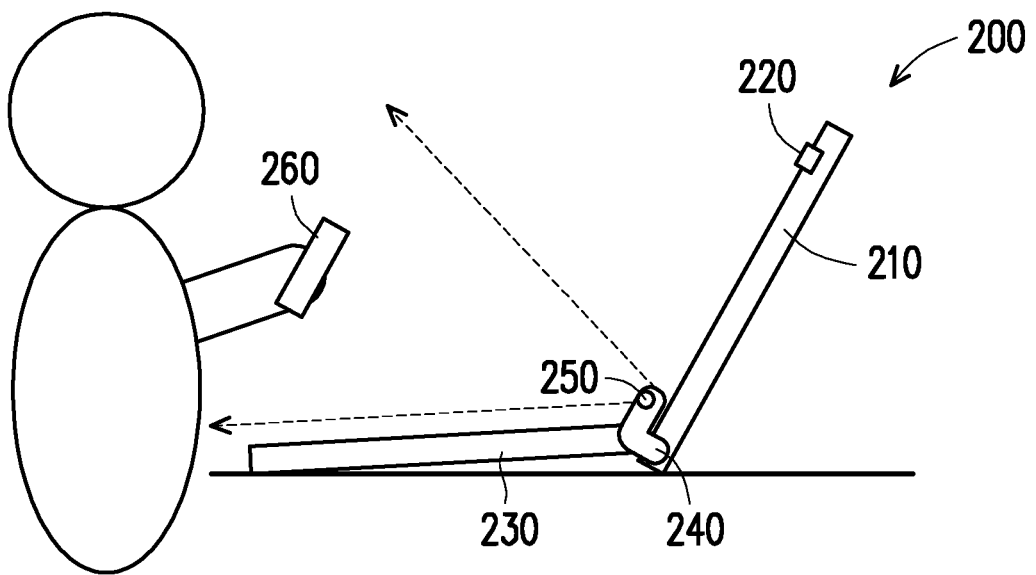
FIGS. 8A to 8G are schematic view illustrating an exemplary embodiment in which AR is run by the electronic device shown in FIG. 2.
Figure 8B:
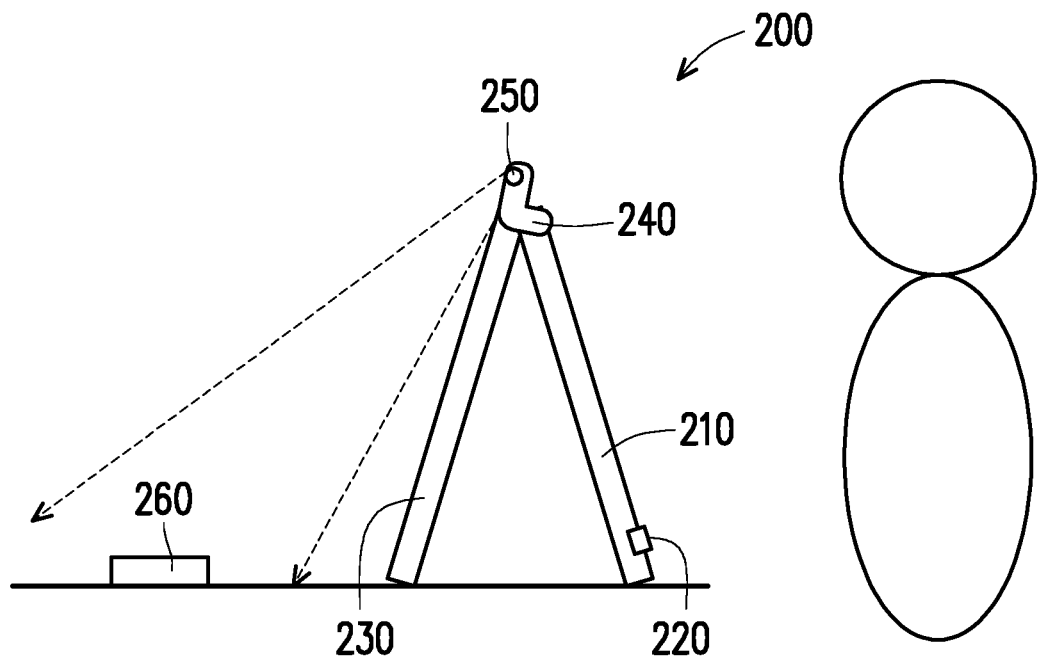

The electronic device 200 further includes the fixed lens 220 and the rotatable camera 250 (shown in FIG. 8A). In addition, according to the position where a marker 260 is arranged, when the fixed lens 220 and the rotatable camera 250 shoot the marker 260, the electronic device 200 may realize an augment reality (AR)-related operation.

Figure 6A:
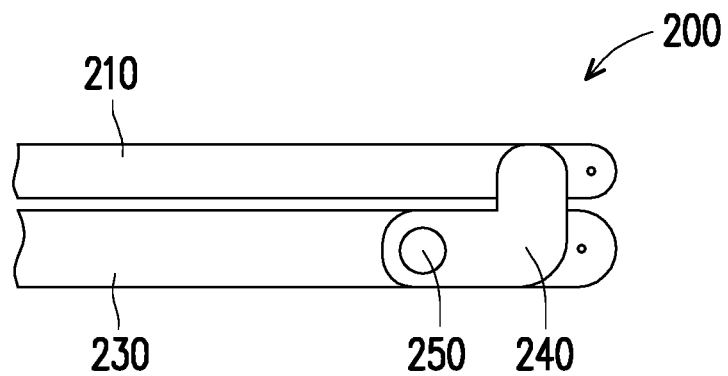
FIG. 6A is a schematic view illustrating that a first body and a second body are closed with respect to each other.

FIG. 6A is a schematic view illustrating that the first body 210 and the second body 230 are closed with respect to each other. Referring to FIG. 6A, in a state where the electronic device 200 is accommodated for storage or not in use, the first body 210 and the second body 230 are closed with respect to each other. In other words, the angle included between the first body 210 and the second body 230 is 0 degrees.

When the user intends to use the electronic device 200, the user may open the first body 210 with respect to the second body 230 and enable the input function of the touch display panel and the input function of the keyboard. Particularly, when the first body 210 is opened with respect to the second body 230, the L-shaped hinge 248 may be simultaneously rotated with the first body 210. Alternatively, the L-shaped hinge 248 may start being rotated simultaneously with the first body 210 when the angle at which the first body 210 is opened with respect to the second body 230 exceeds a first predetermined angle. The first predetermined angle may be between 130 degrees and 160 degrees. In other words, the L-shaped hinge 248 is not always simultaneously rotated with the first body 210.

Figure 6B:
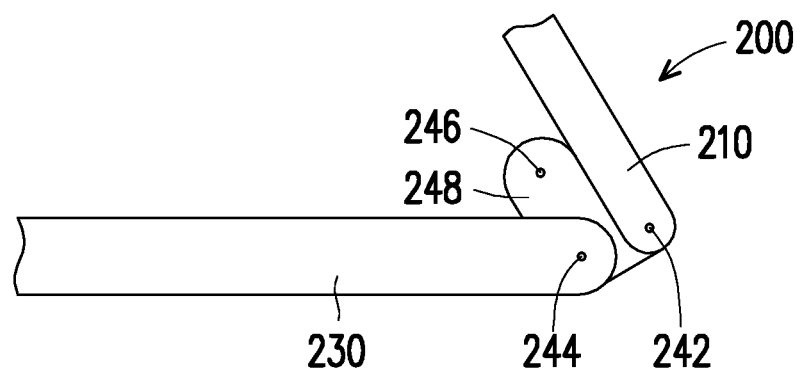
FIGS. 6B to 6E are schematic views illustrating that the first body of the electronic device is rotated with respect to the second body according to an embodiment.
Figure 6C:
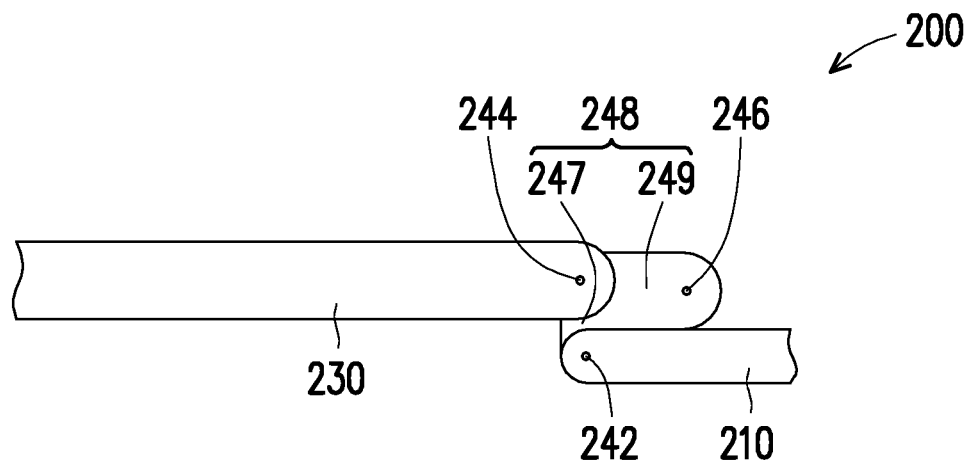
Figure 6D:
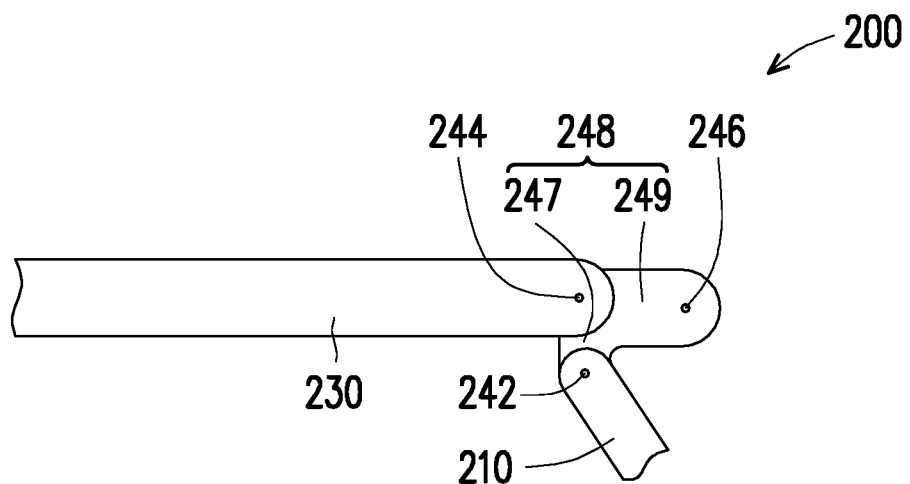
Figure 6E:
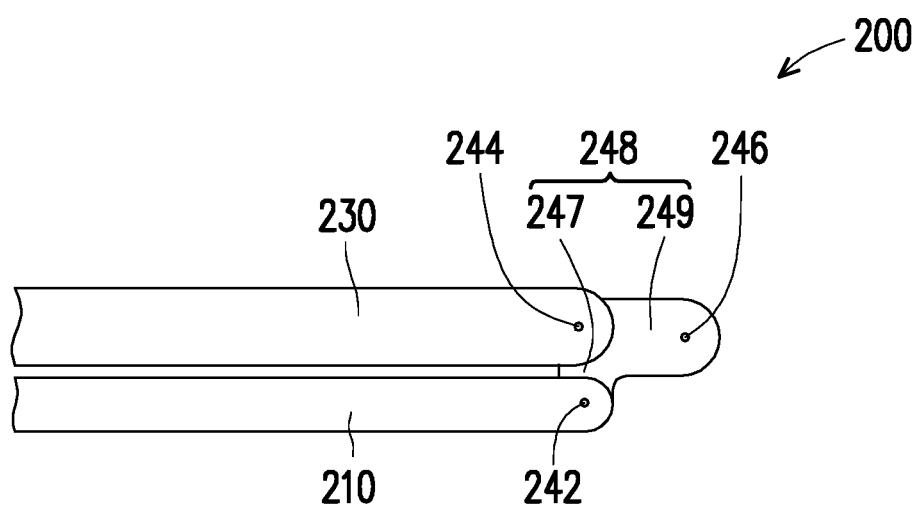

FIGS. 6B to 6E are schematic views illustrating that the first body of the electronic device is rotated with respect to the second body according to an embodiment. As shown in FIGS. 6A to 6C, when the first body 210 is opened with respect to the second body 230 from 0 degrees to 180 degrees, the L-shaped hinge 248 may be simultaneously rotated with the first body 210. Then, as shown in FIGS. 6D and 6E, when the angle at which the first body 210 is opened with respect to the second body 230 exceeds 180 degrees, the L-shaped hinge 248 stops being rotated simultaneously with the first body 210, and the L-shaped hinge 248 is fixed with the second body 230 so that the L-shaped hinge 248 is remain unmoved relative to the second body 230. At this time, the first body 210 may be further rotated with respect to the second body 230 to the extent of exceeding 180 degrees and reaching 360 degrees. Particularly, when the angle at which the first body 210 is opened with respect to the second body 230 exceeds 180 degrees, the input function of the keyboard is turned off, and the electronic device 200 executes a default AR program. Meanwhile, a shooting function of the rotatable camera 250 may be turned on.

Figure 7A:
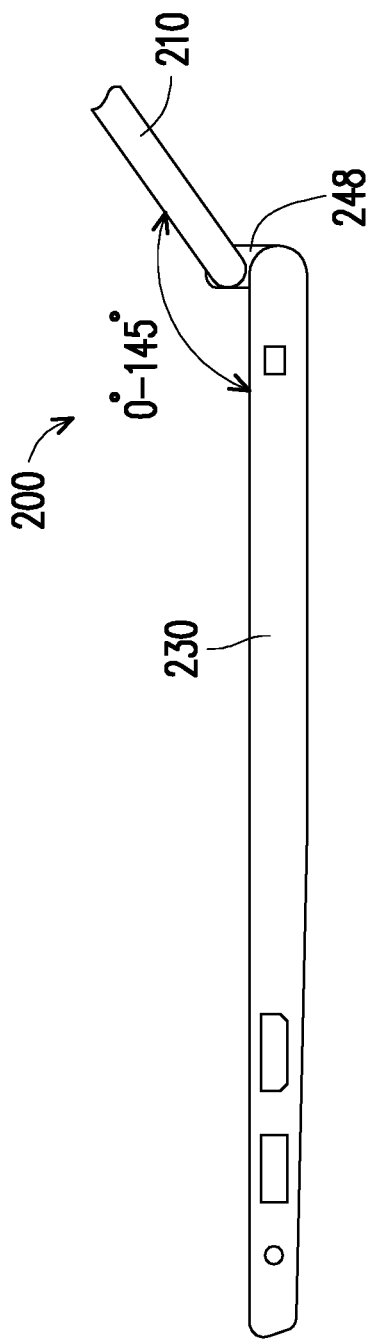
Figure 7B:
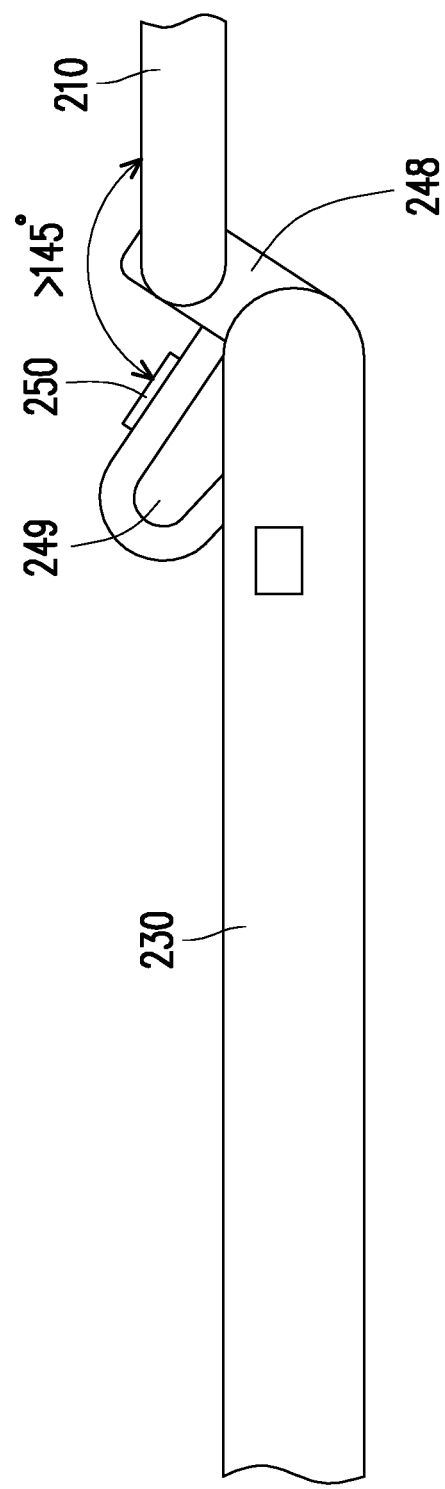

FIGS. 7A to 7D are schematic view illustrating that the first body of the electronic device is rotated with respect to the second body according to another embodiment. As shown in FIGS. 7A and 7B, when the first body 210 is opened with respect to the second body 230 from 0 degrees to, for example, 145 degrees, the L-shaped hinge 248 remains still and is not rotated with the first body 210. Then, as shown in FIGS. 7C and 7D, when the first body 210 is opened with respect to the second body 230 over 145 degrees, for example, the L-shaped hinge 248 starts being rotated with the first body 210. In addition, when the angle at which the first body 210 is opened with respect to the second body 230 reaches 180 degrees, the L-shaped hinge 248 is stopped again. Therefore, even when the angle at which the first body 210 is opened with respect to the second body 230 further increases to exceed 180 degrees or even reach 360 degrees afterwards, the L-shaped hinge 248 is still not rotated simultaneously with the first body 210.

It should also be noted that, through the rotation of the L-shaped hinge 248, the rotatable camera 250 pivotally connected to the second segment 249 of the L-shaped hinge 248 may be rotated to a desired position by using the third hinge 246 to shoot the marker 260.

Compared with the embodiment shown in FIGS. 6B to 6E, the embodiment shown in FIGS. 7A to 7D differs in that the rotating angle of the L-shaped hinge 248 is different, so the second segment 249 in which the rotatable camera 250 is disposed has a greater flipping angle in the embodiment shown in FIGS. 7A to 7D than in the embodiment shown in FIGS. 6B to 6E. Therefore, the range of the angle at which the rotatable camera 250 is able to shoot is further increased.

Figure 8C:
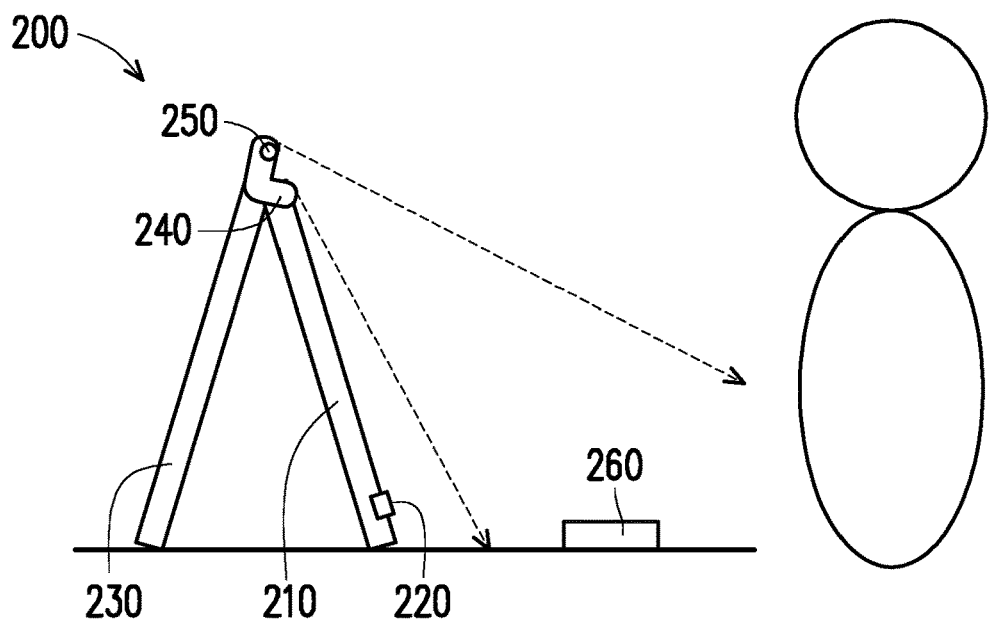
Figure 8D:
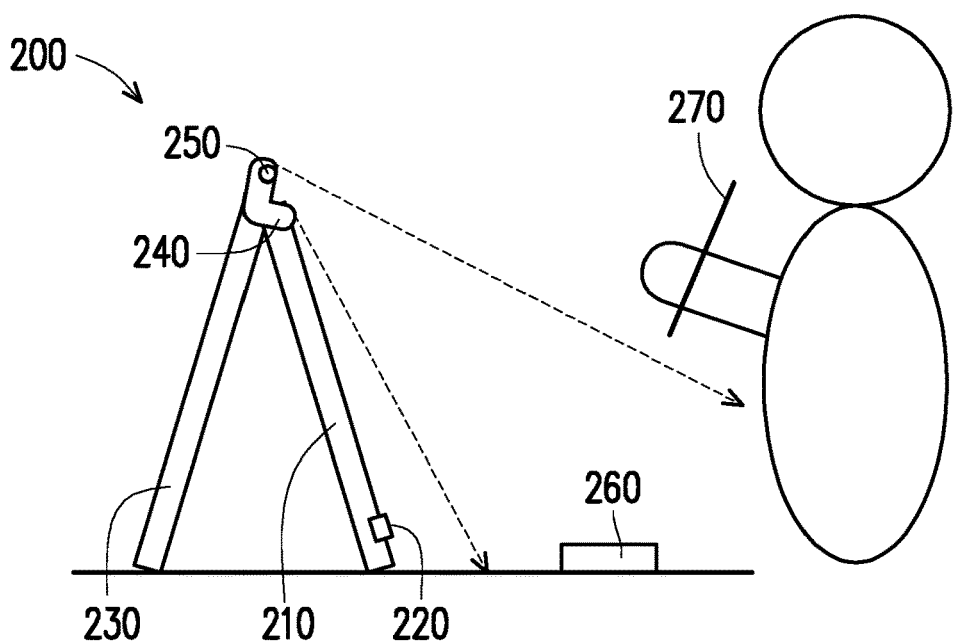
Figure 8E:
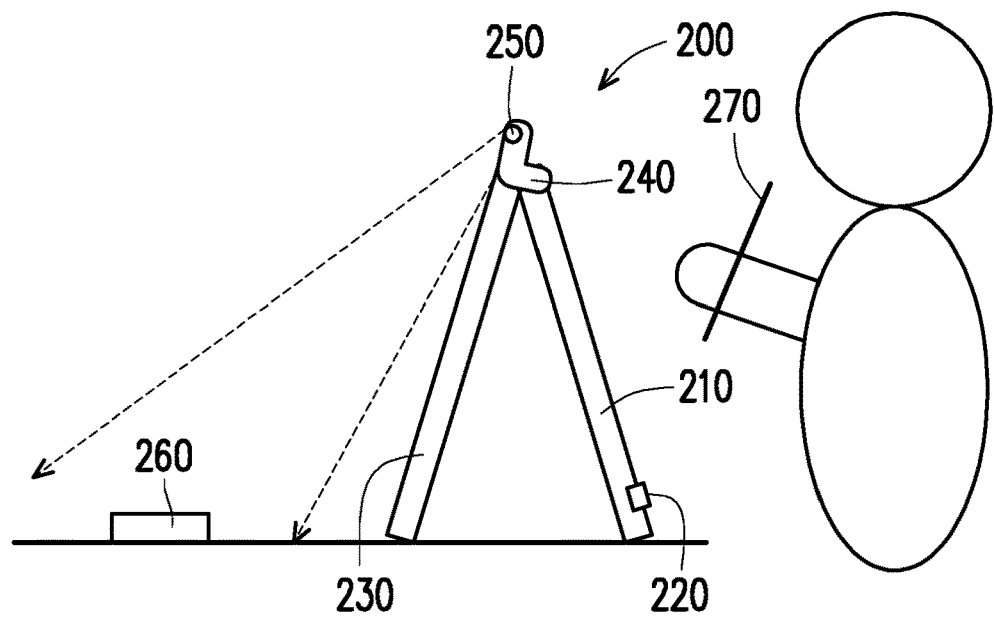
Figure 8F:
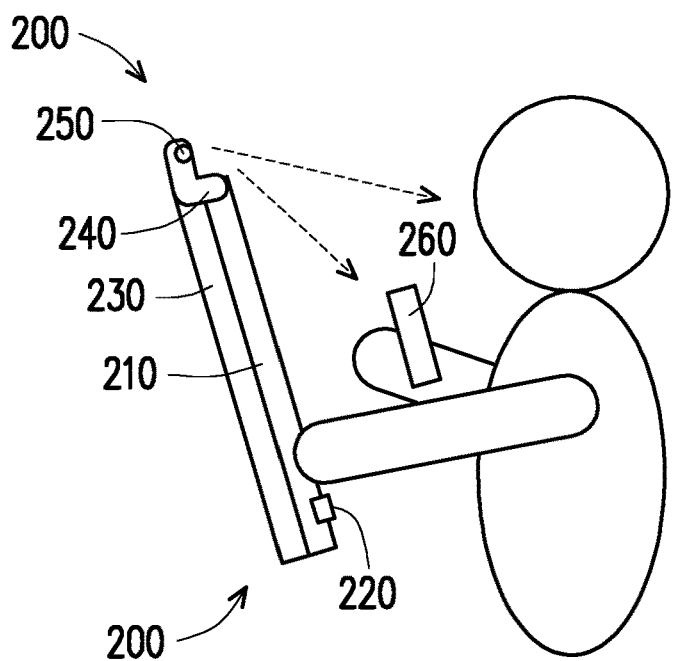
Figure 8G:
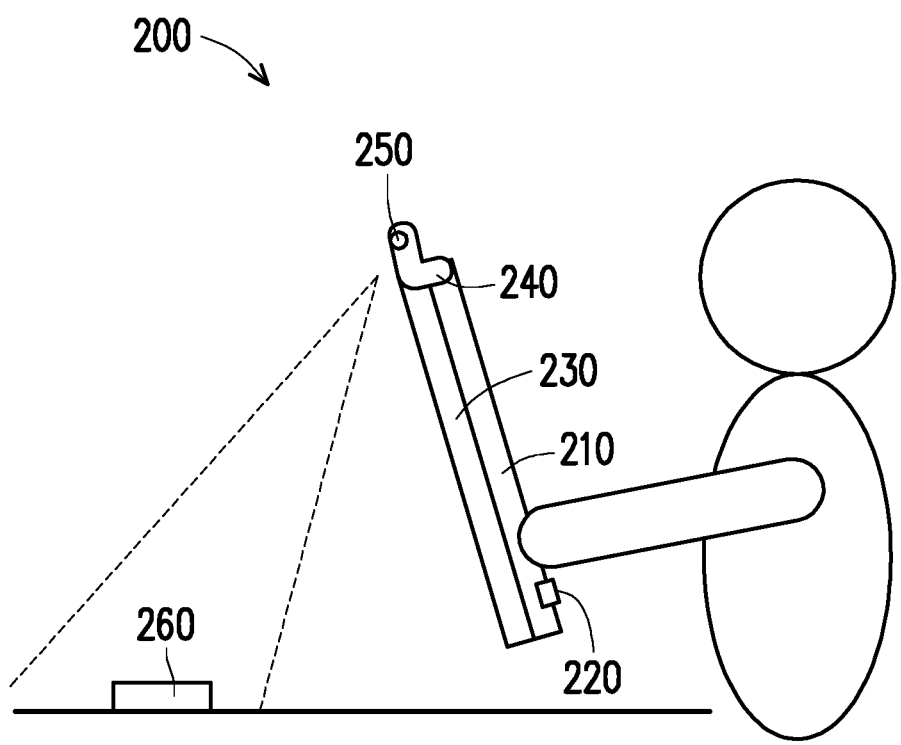

FIGS. 8A to 8G are schematic view illustrating an exemplary embodiment in which AR is run by the electronic device shown in FIG. 2. FIG. 8A illustrates a clamshell mode, FIGS. 8B to 8E illustrate a tent mode, and FIGS. 8F and 8G illustrate a tablet mode.

As shown in FIG. 8A, in the clamshell mode, the range of the angle of the first body 210 with respect to the second body 230 is 90 degrees to 180 degrees. The user may take the marker 260 while viewing the screen, and the rotatable camera 250 may be rotated to a suitable angle based on needs to shoot the marker 260. At this time, the user may view AR contents while typing or perform an AR-related operation with a gesture. In addition, when using AR, the user is not required to hold the electronic device 200 with hands.

As shown in FIGS. 8B to 8E, in the tent mode, the range of the angle of the first body 210 with respect to the second body 230 is 180 degrees to 360 degrees. The user may place the marker 260 on the desk and view the screen, and the rotatable camera 250 may be rotated to a suitable angle based on needs to shoot the marker 260.

Meanwhile, the input function of the keyboard of the second body 230 is turned off. At this time, the default AR program may be executed, and the shooting function of the rotatable camera 250 may be turned on. In addition, whether the marker 260 is present in the shooting range of the rotatable camera 250 is also sensed and determined. When the marker 260 is sensed as being present in the shooting range of the rotatable camera 250, the rotatable camera 250 is instructed to generate a first trigger image, and the first trigger image is displayed on the touch display panel of the first body 210. In addition, a first trigger command is generated based on the first trigger image, and based on the first trigger command, the touch display panel is instructed to display a virtual object, and the virtual object is overlapped or partially overlapped with the first trigger image.

Particularly, based on needs, the marker 260 may be placed on a side same as or different from the side of the user. Specifically, as shown in FIGS. 8C and 8D, the marker 260 and the user are located on the same side of the electronic device 200, while in FIGS. 8B and 8E, the marker 260 and the user are located on different sides with respect to the electronic device 200. Moreover, in FIGS. 8D and 8E, the user may further hold a touch pen 270 with his/her hand to perform an operation.

In the tent mode, the user may view AR contents while operating an AR function, or use the touch pen 270 to draw and write, and it is not necessary to hold the handheld device 200 with his/her hands.

As shown in FIGS. 8F and 8G, in the tablet mode, the first body 210 is flipped 360 degrees with respect to the second body 230, and the user may hold the electronic device 200 and the marker 260 or hold the electronic device 200 while placing the marker 260 on the desk to view the screen, and the rotatable camera 250 may be rotated to a suitable angle based on needs to shoot the marker 260.

In the tablet mode, the user may view AR contents while operating an AR function, or view AR contents while drawing and writing with the touch pen 270.

Figure 8H:
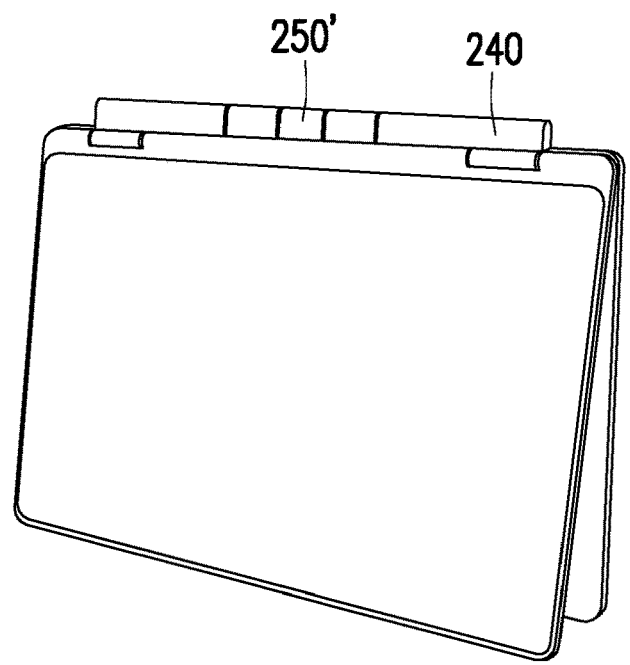
FIGS. 8H to 8J are schematic views illustrating that a rotatable camera is rotated around a direction perpendicular to a third hinge as an axis of rotation to protrude from a hinge assembly.
Figure 8I:
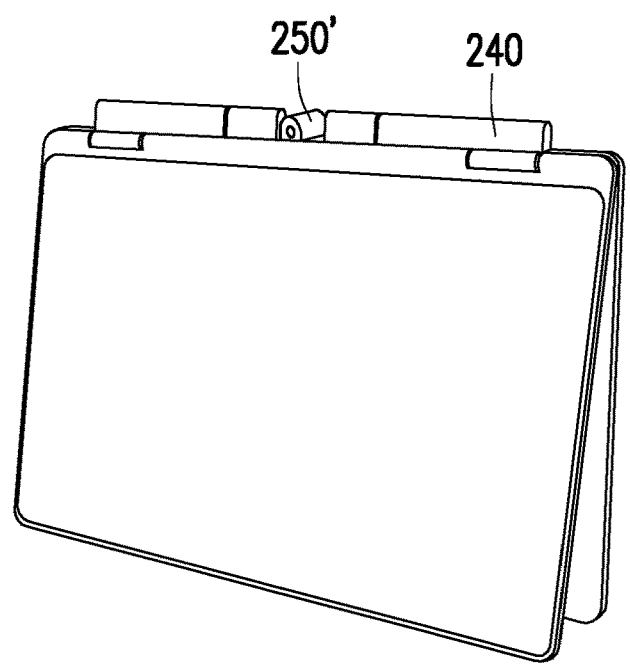
Figure 8J:
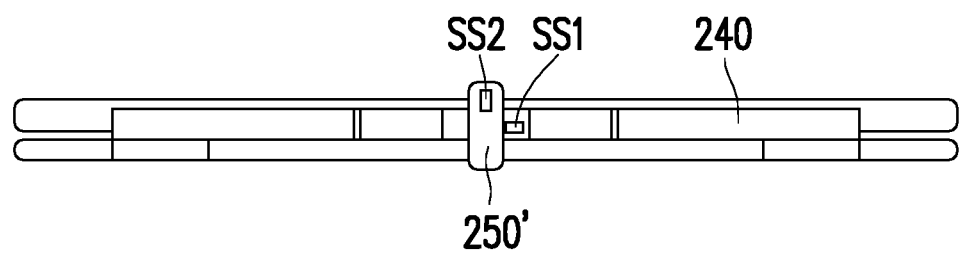

It should also be noted that, in FIGS. 8A to 8G, the rotatable camera 250 is rotatable around the third hinge 246 as an axis of rotation However, in other embodiments, a rotatable camera 250' may be configured to adopt a direction perpendicular to the third hinge 246 as the axis of rotation. Therefore, when the rotatable camera 250' is used, the rotatable camera 250' may be rotated out from the hinge assembly 240, as shown in FIGS. 8H to 8J. In this embodiment, lens sets are disposed on two sides of the rotatable camera 250' (but it should be noted that the invention is not limited thereto). In this way, before the rotatable camera 250' is rotated out (e.g., FIG. 8H), the lens sets are hidden in the hinge assembly 240 for protection of the user's privacy. When the rotatable camera 250' is rotated out (e.g., FIGS. 8I and 8J), the rotatable camera 250' is rotated out and protrudes from the hinge assembly 240. Thus, the shooting range is further widened. For example, a 360-degree surrounding effect may be achieved by stitching images taken by two fish-eye lenses whose field of view is greater than 180 degrees. Moreover, with a hardware configuration (e.g., disposing corresponding sensors SS1 and SS2 to the hinge assembly 240 and the rotatable camera 250') or a program design, the shooting function of the rotatable camera 250' may be simultaneously enabled and ready for use simultaneously when the rotatable camera 250' is rotated out from the hinge assembly 240 and be disabled simultaneously when the rotatable camera 250' is rotated back into the hinge assembly 240, thereby making the operation more intuitive.

Besides, a speaker (not shown) may be disposed in the first body 210 or the second body 230, and the volume generated by the speaker (not shown) may be adjusted according to determination on a second trigger image generated by the fixed lens 220 or the rotatable camera 250.

Specifically, when it is determined that the second trigger image is an image in which the user covers his/her ear with his/her hand, the electronic device 200 may turn down the volume generated by the speaker (not shown), and when it is determined that the second trigger image is an image in which the user places his/her hand behind his/her ear, the electronic device 200 may turn up the volume of the speaker.

Moreover, a sound receiver (not shown) may also be disposed in the first body 210 or the second body 230. The sound receiver (not shown) serves to receive the user's speaking sound or an ambient sound. In addition, when it is determined that the second trigger image is an image in which the user places a finger on his/her lips, the sound receiver (not shown) is disabled.

Figure 9A:
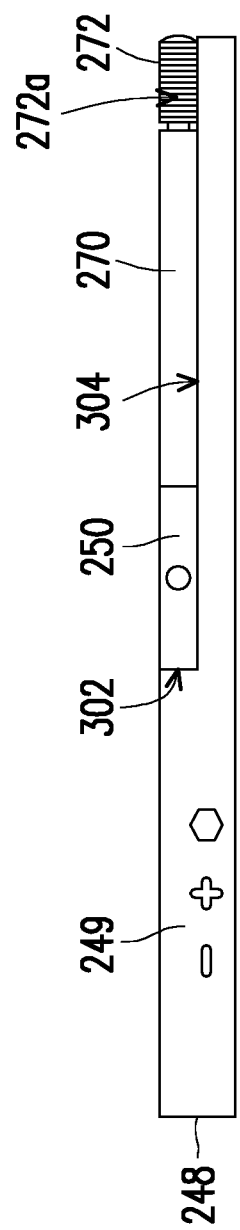
FIG. 9A is a schematic view illustrating that a rotatable camera and a touch pen are assembled to an L-shaped hinge.

FIG. 9A is a schematic view illustrating that a rotatable camera and a touch pen are assembled to an L-shaped hinge. Referring to FIG. 9A, the second segment 249 of the L-shaped hinge 248 has a fixing part 302 and a second accommodating groove S2. The rotatable camera 250 may be accommodated in the second accommodating groove S2, and may be assembled to the fixing part 302 or be removed from the fixing part 302.

The third hinge 246 may be formed at a first side 250a of the rotatable camera 250. Also, in an embodiment, the third hinge 246 may have an external thread (not shown), and the fixing part 302 may have an internal thread (not shown). When the rotatable camera 250 is assembled to the second segment 249 of the L-shaped hinge 248, the rotatable camera 250 is assembled to the fixing part 302 through the internal thread and the external thread matching each other.

Besides, the electronic device 200 further includes the touch pen 270 assembled to a second side 250b of the rotatable camera 250. In addition, when the rotatable camera 250 is assembled to the touch pen 270 and is removed from the fixing part 302 of the second segment 249 of the L-shaped hinge 248, the user may hold the touch pen 270 and arbitrarily change the shooting angle and the shooting style of the rotatable camera 250, so as to make the rotatable camera 250 more convenient for being portable.

Figure 9B:
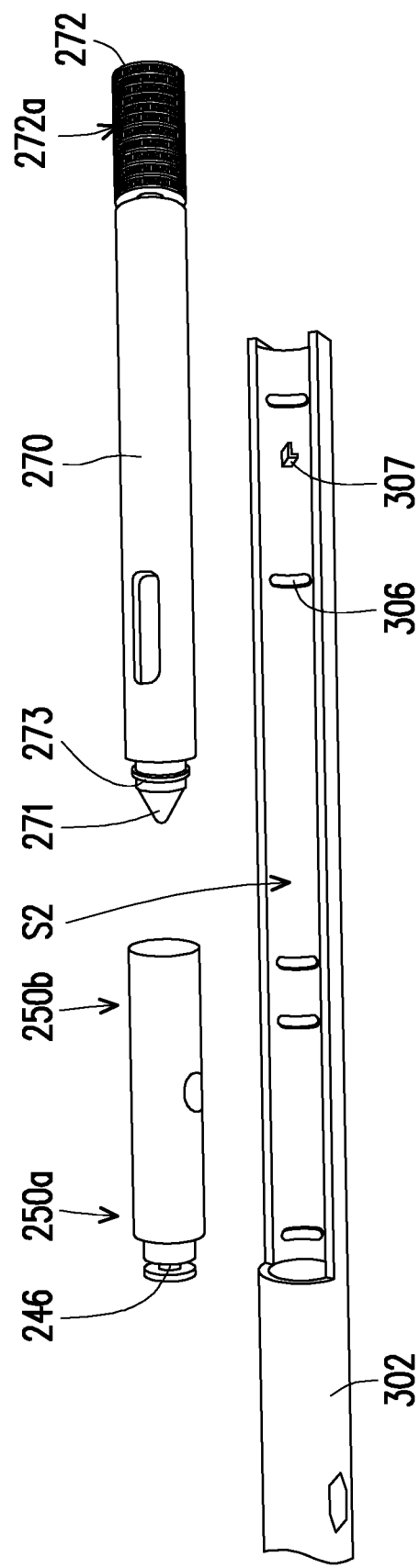
FIG. 9B is a schematic exploded view of the rotatable camera, the touch pen, and the L-shaped hinge of FIG. 9A.
Figure 9C:
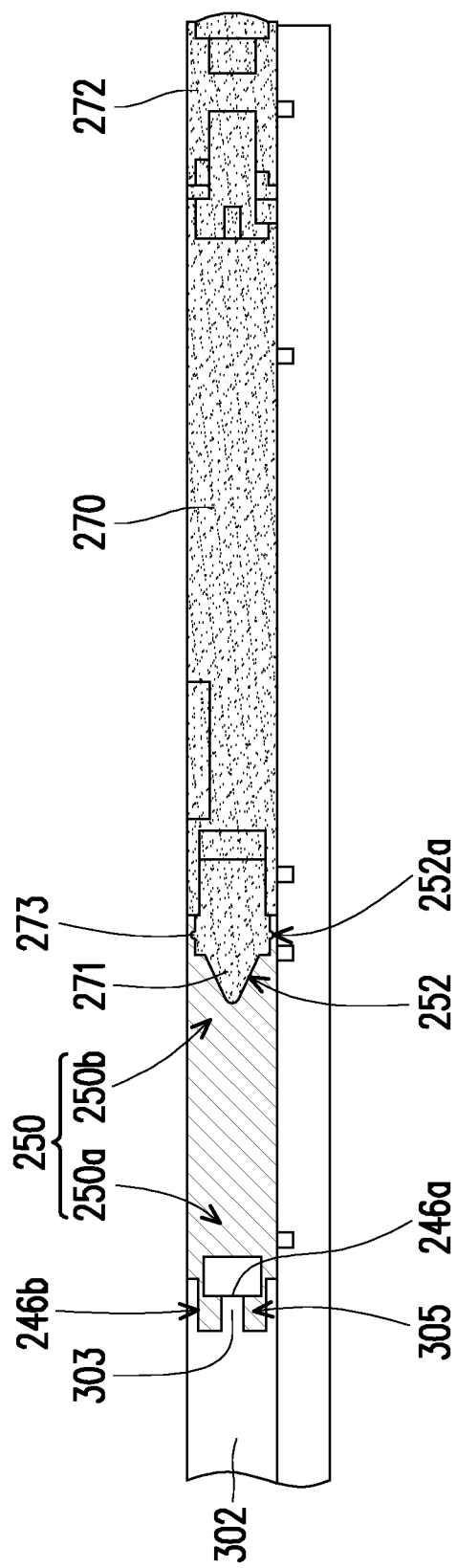
FIG. 9C is a cross-sectional view of FIG. 9A.

FIG. 9B is a schematic exploded view of the rotatable camera, the touch pen, and the L-shaped hinge of FIG. 9A, and FIG. 9C is a cross-sectional view of FIG. 9A. Referring to FIGS. 9A to 9C, the second side 250b of the rotatable camera 250 has a tapered recess 252, and the touch pen 270 has a pen tip end 271 and a pen rear end 272 on opposite two sides. The pen tip end 271 is correspondingly fit into the tapered recess 252, and the pen rear end 272 may have a rough surface 272a.

The pen tip end 271 of the touch pen 270 has a positioning protruding ring 273 disposed along the circumferential direction of the touch pen 270, and the tapered recess 252 is provided with a positioning recessed ring 252a correspondingly. Thus, by holding the pen rear end 272 of the touch pen 270, which has the rough surface 272a, the user may fit the positioning protruding ring 273 at the tip end 271 into the positioning ring 252a of the tapered recess 252.

Figure 10:
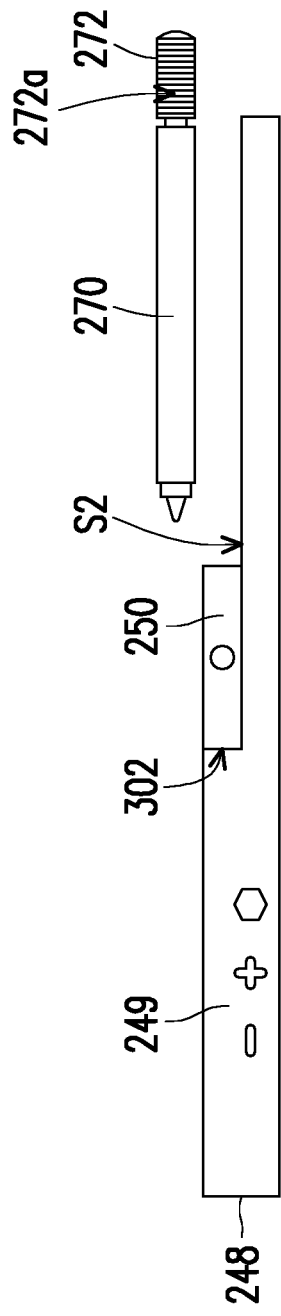
FIG. 10 is a schematic view illustrating that the rotatable camera is fixed to the L-shaped hinge and the touch pen is removed.
Figure 11:
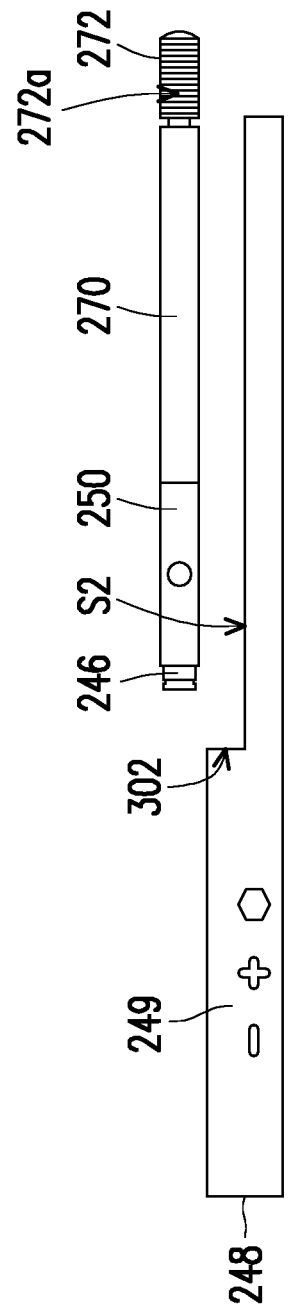
FIG. 11 is a schematic view illustrating that the rotatable camera and the lens pen are assembled and are removed from the L-shaped hinge together.

It should be also noted that the touch pen 270 may be assembled to the rotatable camera 250 or be removed from the rotatable camera 250 (as shown in FIG. 10). Alternatively, it may also be that, when the touch pen 270 and the rotatable camera 250 are assembled together, the rotatable camera 250 assembled to the fixing part 302 of the second segment 249 of the L-shaped hinge 248 is removed (as shown in FIG. 11) by rotating the pen rear end 272 of the touch pen 270, which has the rough surface 272a, or the rotatable camera 250 may be assembled to the fixing part 302 of the second segment 249 of the L-shaped hinge 248 by rotating the pen rear end 272 of the touch pen 270. By allowing the rotatable camera 250 and the touch pen 270 to be assembled and be removed from the L-shaped hinge 248 together, the user may conveniently hold the touch pen 270 and adjust the shooting angle and the shooting position of the rotatable camera 250. In addition, the holding hand may be prevented from blocking the rotatable camera 250, which may affect shooting and use of the rotatable lens 250.

Further to the above, in the embodiment of FIGS. 9A, 9B, and 9C, the third hinge 246 has an inner recess 246a, and the fixing part 302 has an engaging block 303. The engaging block 303 and the inner recess 246a may offer dummy proof With the engaging block 303 and the inner recess 246 corresponding to each other in proper shapes to be engaged to each other, the user may be refrained from applying an excessive force to bluntly assemble the third hinge 246 with the fixing part 302 and thus cause damage. Besides, the fixing part 302 also has a sidewall surrounding the engaging block 303, and an annular protruding block 305 is disposed on the sidewall, while an annular recess 246b is disposed on the outer edge of the third hinge 246, and the annular block 305 and the annular recess 246b are suitable to be engaged with each other.

To prevent the assembly of the touch pen 270 and the rotatable camera 250 from being rubbed against and affected by the groove wall of the second accommodating groove S2, a plurality of support rings 306 are further disposed in the second accommodating groove S2 to support the touch pen 270, as shown in FIG. 9B.

Figure 12A:
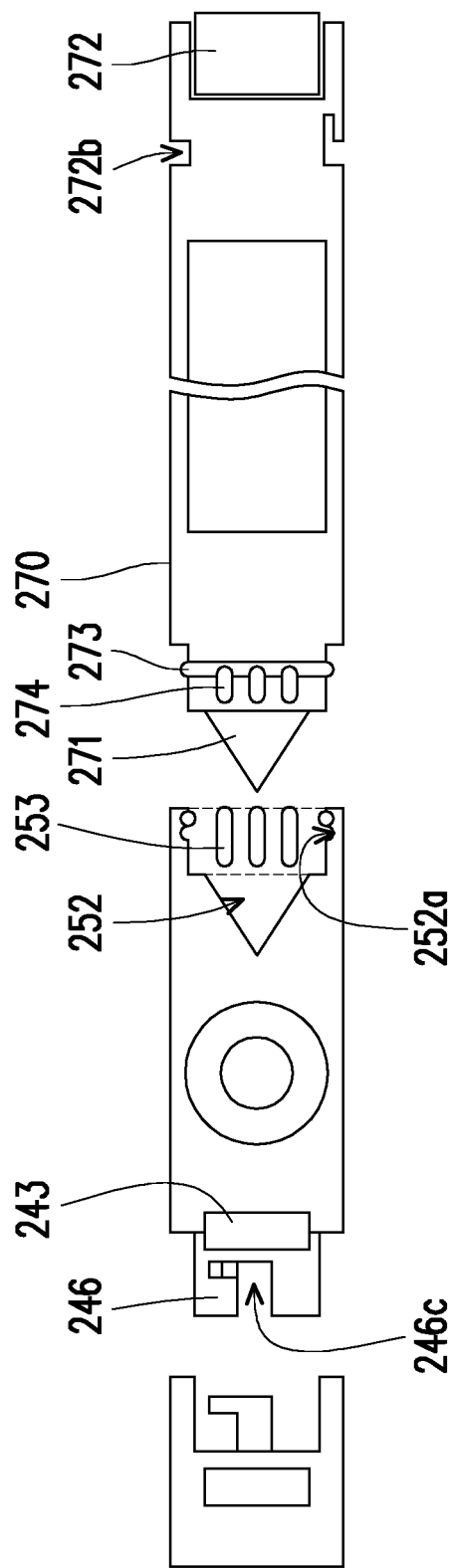
FIG. 12A is a schematic exploded cross-sectional view illustrating a fixing part, a rotatable camera and a touch pen according to another embodiment.

FIG. 12A is a schematic exploded cross-sectional view illustrating a fixing part, a rotatable camera and a touch pen according to another embodiment. Referring to FIG. 12A, compared with FIGS. 9A to 9C showing that the positioning protruding ring 273 is disposed at the third hinge 246 to be engaged and thus assembled with the positioning recessed ring 252a at the fixing part 302, a first slot 246c may be disposed at the third hinge 246 of the embodiment, and the fixing part 302 is provided with a first hook 302a. The first hook 302a is suitable to be latched into the first slot 246c to fix the third hinge 246 to the fixing part 302.

In addition, to properly attach the third hinge 246 to the fixing part 302, the hinge assembly 240 may further include a first magnet 243 disposed at the fixing part 302, and the third hinge 246 may be magnetic to be attracted to the first magnet 243. Alternatively, a second magnet 243 may be disposed at the third hinge 246, so that the second magnet 245 and the first magnet 243 are attracted to each other.

In addition, the pen tip end 271 of the touch pen 270 has a positioning rib 274 disposed along a radial direction of the touch pen 270, and the tapered recess 252 is provided with a positioning recess 253 correspondingly. The positioning rib 274 is correspondingly fit into the positioning recess 253, so that the touch pen 270 and the rotatable camera 250 are assembled together desirably.

Figure 12B:
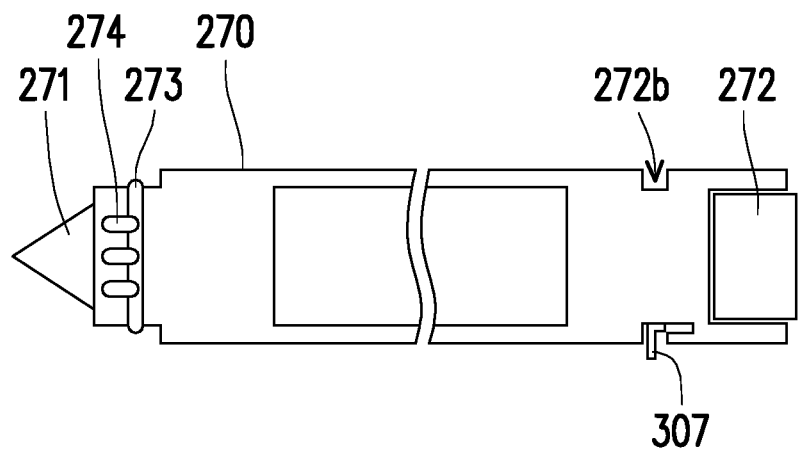
FIG. 12B is a schematic cross-sectional view illustrating that a slot is disposed at a pen rear end of the touch pen and a hook is disposed in a second accommodating groove.
Figure 12C:
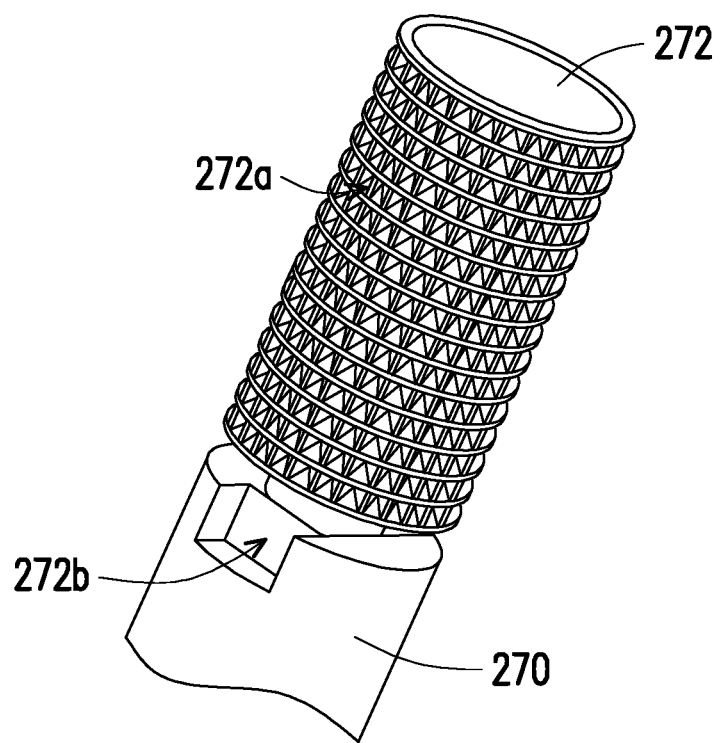
FIG. 12C is a schematic perspective view illustrating that the slot is disposed at the pen rear end of the touch pen of FIG. 12B.

FIG. 12B is a schematic cross-sectional view illustrating that a slot is disposed at a pen rear end of the touch pen and a hook is disposed in a second accommodating groove, and FIG. 12C is a schematic perspective view illustrating that the slot is disposed at the pen rear end of the touch pen of FIG. 12B. Referring to FIGS. 9B, 12B, and 12C, to prevent the touch pen 270 from being detached from the second accommodating groove S2, a second slot 272b may be disposed at the pen rear end 272 of the touch pen 270, and the second accommodating groove S2 is provided with a second hook 307. In addition, with the movement of the touch pen 270 along the radial direction of the second accommodating groove S2, the second hook 307 may be latched into the second slot 272b.

With the second hook 307 being latched into the second slot 272b, the touch pen 270 may be firmly fixed in the second accommodating groove S2, and when the touch pen 270 is moved in the radial direction of the second accommodating groove S2 to be fixed in the second accommodating groove S2, the touch pen 270 is still rotatable relative to the second accommodating groove S2.

It should be noted that the touch pen of the embodiment allows the user to choose a command on the first body 210 of the electronic device 200 by pressing a portion of the touch pen 270.

Figure 13:
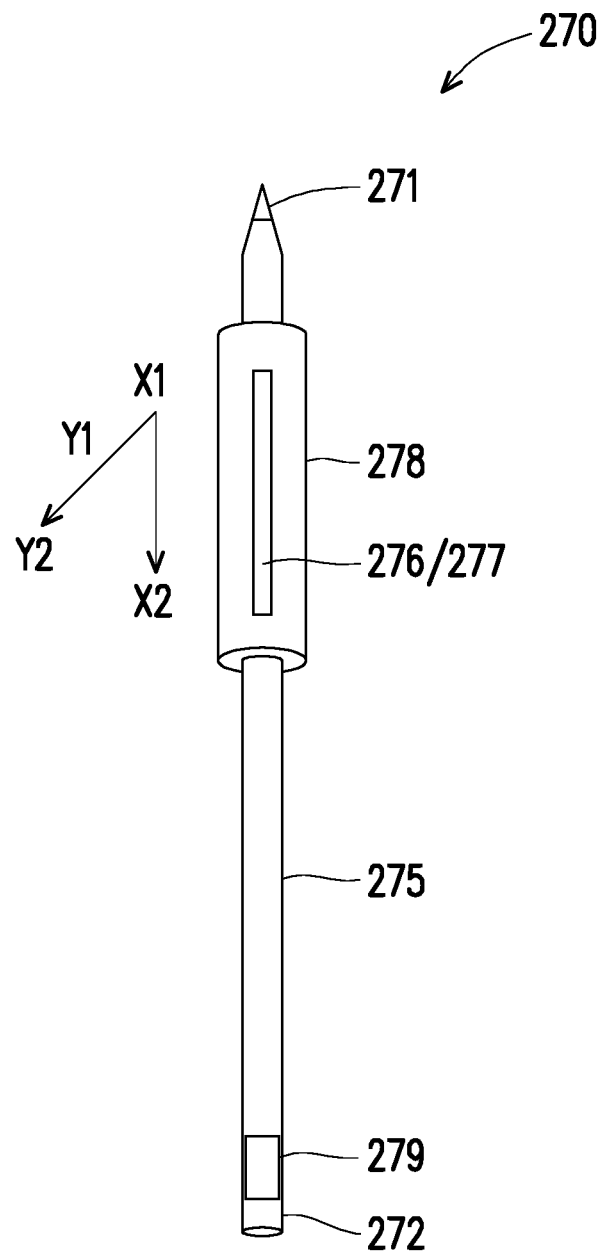
FIG. 13 is a schematic view illustrating a touch pen.
Figure 14:
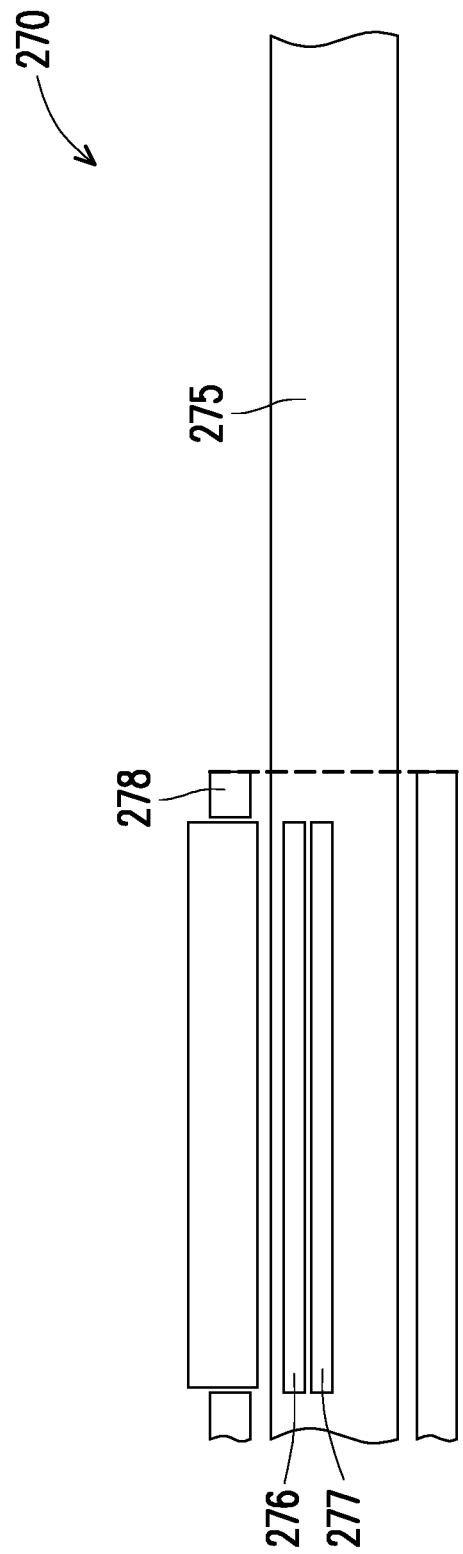
FIG. 14 is a partial cross-sectional view of the touch pen of FIG. 13.

FIG. 13 is a schematic view illustrating a touch pen, and FIG. 14 is a partial cross-sectional view of the touch pen of FIG. 13. Referring to FIGS. 9B, 13, and 14, the touch pen 270 further includes a pen body 275 between the pen tip end 272 and the pen rear end 272 and a touch sensor 276 and a pressure sensor 277 disposed inside the pen body 275. The touch sensor 276 serves to sense an axial input along the axial direction of the touch pen 270, and the pressure sensor 277 serves to sense a radial input along the radial direction of the touch pen 270. In the embodiment, the pressure sensor 277 and the touch sensor 276 may be disposed to be stacked.

The touch pen 270 may further include a slidable tube 278 sleeved on the pen body 275. In addition, the slidable tube 278 is slidable with respect to the pen body 275 on the pen body 275.

Figure 15:
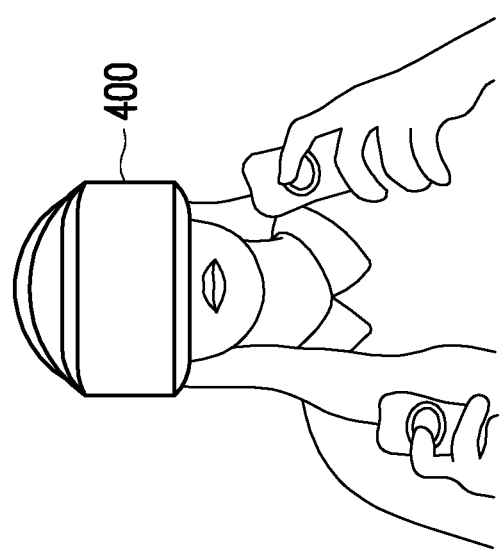
FIG. 15 is a schematic view illustrating an external electronic device.

FIG. 15 is a schematic view illustrating an external electronic device, FIG. 16A is a schematic view illustrating that a slidable tube moves toward a pen rear end, and FIG. 16B is a schematic view illustrating that the slidable tube slides to a position corresponding to a touch sensor and a pressure sensor. Referring to FIGS. 15, 16A, and 16B, when the touch pen 270 is inserted into an external electronic device 400 (as shown in FIG. 15), the slidable tube 278 slides to the position at the pen rear end 272 (or the position at the pen tip end 271), as shown in FIG. 15, for the convenience of accommodating the touch pen 270 on the external electronic device 400. When the touch pen 270 is retrieved from the external electronic device 400, the slidable tube 278 slides to a position corresponding to the touch sensor 276 and the pressure sensor 277.

Referring to FIG. 13, the touch pen 270 further includes a wireless communicating element 279 disposed inside the pen body 275. The wireless communicating element 279 is disposed at the rear end of the pen body 275 or the pen rear end 272 and serves for wireless communication with the external electronic device 400. The wireless communicating element 279 may be a Bluetooth device.

Table 1 shows displayed operation of user interface (UI) in the first body 210 (as shown in FIG. 2) corresponding to the touch pen 270 and changes of pressure positions sensed by the pressure sensor 277 when the user sends a gestural command by using the touch pen 270.

TABLE 1

| Displayed operation of UI | Gestural command | Change of pressure position |
|---|---|---|
| Display a UI initial frame | light clicks twice on the first end | (X1, Y1) (X1, Y1) |
| Slide up the choice on interface function | Click heavily and slide toward the pen rear end | (X1→X2, Y2) |
| Slide down the choice on interface function | Click heavily and slide toward the pen tip end | (X2→X1, Y2) |
| Confirm | Release | (X, Y) (X0, Y0) |
| Slide down the window | Click lightly and slide up | (X1→X2, Y2) |
| Slide up the window | Click lightly and slide forward | (X2→X1, Y2) |
| Close UI | Press the second end heavily twice | (X2, Y2) (X2, Y2) |

Referring to Table 1, when the touch sensor 276 senses axial inputs twice and when the pressure sensor 277 also senses radial inputs twice, the wireless communicating element 279 generates a command for turning on the UI or a command for turning off the UI, and transmits the generated command to an external electronic device. The external electronic device may be the external electronic device 400 shown in FIG. 15 or another external electronic device different than the external electronic device 400.

When the touch sensor 276 senses an axial input toward the pen rear end 272 and the pressure sensor 277 senses a continuous radial input, the wireless communicating element 279 generates a command for sliding down in the user interface or a command for moving up a choice in the user interface, and transmits the generated command to the external electronic device 400.

When the touch sensor 276 senses an axial input toward the pen tip end 271 and the pressure sensor 277 senses a continuous radial input, the wireless communicating element 279 generates a command for sliding down in the user interface or a command for moving down the choice in the user interface and transmitting the generated command to the external electronic device 400.

When the touch sensor 276 senses the axial input once, and the pressure sensor 277 also senses the radial input once, the wireless communicating element 279 generates a command for confirmation, and transmits the command for confirmation to the external electronic device 400.

When the touch sensor 276 does not sense an axial input, while the pressure sensor 277 senses a continuous radial input, the wireless communicating element 279 generates a command for drawing a line, and transmits the generated command to the external electronic device 400. The command for drawing a line includes a command on line thickness positively proportional to a magnitude of a value of the sensed continuous radial input.

Particularly, when the external electronic device 400 is a head-mounted electronic device, the external electronic device 400 is different from the electronic device 100 which is a notebook computer, but may be an AR device, virtual reality (VR) device, or a mixed reality (MR) device, and the command for drawing a line is a command for drawing a spatial line.

In view of the foregoing, the hinge assembly in the electronic device of the invention is modified. Specifically, the L-shaped hinge is chosen, and with the special shape and the angular design of the L-shaped hinge, the limitation on the shooting angle of the lens disposed at the first body in the scenario of AR is alleviated. Therefore, for the user, AR-related operations may be carried out smoothly in various different scenarios of use.

Moreover, since the rotatable camera may be detached from the body based on the needs, the user may move the rotatable camera during use thereof, which makes the device more convenient to use.

In addition, with the touch sensor and the pressure sensor disposed inside the touch pen, the user may hold the touch pen and directly send a command/choice to the first body by using a gesture.

Furthermore, the AR interaction process allows the user to carry out interactive education or entertainment, which makes learning more interesting and increases the level of entertainment.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. An electronic device, comprising:
   a first body;
   a second body;
   a hinge assembly, comprising:
     a first hinge, a second hinge, and a third hinge;
     an L-shaped hinge structure, having a first segment and a second segment, wherein an extending direction of the first segment is perpendicular to an extending direction of the second segment, the first segment is pivotally connected to the first body through the first hinge, the second segment is pivotally connected to the second body through the second hinge, and the first hinge, the second hinge, and the third hinge are parallel to each other and are not coaxial with each other; and
   a camera, assembled to the second segment,
   wherein the camera rotates around the third hinge as an axis of rotation with respect to the second segment.

2. The electronic device as claimed in claim 1, wherein a first accommodating groove is formed in the first body and the second body to accommodate the L-shaped hinge structure.

3. The electronic device as claimed in claim 1, wherein when a range of an angle at which the first body being flipped with respect to the second body is 0 degrees to 180 degrees, the L-shaped hinge structure is rotated simultaneously with the first body.

4. The electronic device as claimed in claim 3, wherein when a range of an angle at which the first body being flipped with respect to the second body is 180 degrees to 360 degrees, the L-shaped hinge structure is fixed with the second body and unmoved relative to the second body.

5. The electronic device as claimed in claim 1, wherein when an angle at which the first body being flipped with respect to the second body is less than or equal to a first predetermined angle, the L-shaped hinge structure is fixed with the second body and unmoved relative to the second body.

6. The electronic device as claimed in claim 5, wherein when the angle at which the first body being flipped with respect to the second body is greater than the first predetermined angle, the L-shaped hinge structure is moved simultaneously with the first body.

7. The electronic device as claimed in claim 6, wherein the first predetermined angle is between 130 degrees and 160 degrees.

8. The electronic device as claimed in claim 1, wherein a range of an angle at which the first body being flipped with respect to the second body is 0 degrees to 360 degrees.

9. The electronic device as claimed in claim 1, wherein the camera rotates around a direction perpendicular to the third hinge as an axis of rotation with respect to the second segment.

10. A hinge assembly, comprising:
    a first hinge, a second hinge, and a third hinge;
    an L-shaped hinge structure, having a first segment and a second segment,
      wherein an extending direction of the first segment is perpendicular to an extending direction of the second segment, the first segment is pivotally connected to a first body through the first hinge, and the second segment is pivotally connected to a second body through the second hinge; and
    a camera, pivotally connected to the second segment through the third hinge,
    wherein the first hinge, the second hinge, and the third hinge are parallel to each other and not coaxial with each other, and
    the camera rotates around the third hinge as an axis of rotation with respect to the second segment.

11. The hinge assembly as claimed in claim 10, wherein an extending direction of the first segment is perpendicular to an extending direction of the second segment.

12. The hinge assembly as claimed in claim 10, wherein the second segment has a second accommodating groove, and the camera is accommodated in the second accommodating groove.

13. The hinge assembly as claimed in claim 12, wherein the second segment has a fixing part, and the camera is detachably assembled to the fixing part.

14. The hinge assembly as claimed in claim 13, wherein the third hinge has an outer thread, the fixing part has an inner thread, and the inner thread and the outer thread match each other.

15. The hinge assembly as claimed in claim 13, wherein the third hinge has an inner recess, the fixing part has an engaging block, and the engaging block and the inner recess are in proper shapes to be engaged with each other.

16. The hinge assembly as claimed in claim 15, wherein the fixing part has a sidewall surrounding the engaging block.

17. The hinge assembly as claimed in claim 16, wherein an annular recess is disposed on an outer edge of the third hinge, an annular block is disposed on the sidewall, and the annular block and the annular recess are suitable to be engaged with each other.

18. The hinge assembly as claimed in claim 13, wherein the third hinge has a first slot, the fixing part is provided with a first hook, and the first hook is suitable to be latched to the first slot.

19. The hinge assembly as claimed in claim 13, wherein the hinge assembly further comprises a first magnet disposed at the fixing part, and the third hinge is magnetic to be attracted to the first magnet.

20. The hinge assembly as claimed in claim 19, further comprising a second magnet disposed at the third hinge, so that the second magnet and the first magnet are attracted to each other.

21. The hinge assembly as claimed in claim 12, wherein the third hinge is formed on a first side of the camera.

22. The hinge assembly as claimed in claim 21, further comprising a touch pen detachably assembled on a second side of the camera, wherein the touch pen has a pen tip end and a pen rear end on opposite two sides.

23. The hinge assembly as claimed in claim 22, wherein a tapered recess is provided on the second side, and the pen tip end is correspondingly fit into the tapered recess.

24. The hinge assembly as claimed in claim 23, wherein the pen rear end of the touch pen has a second slot, the second accommodating groove is provided with a second hook, and the second hook is suitable to be latched into the second slot.

25. The hinge assembly as claimed in claim 23, wherein the pen rear end of the touch pen has a rough surface.

26. The hinge assembly as claimed in claim 23, wherein the pen tip end of the touch pen has a positioning protruding ring disposed along a circumferential direction of the touch pen, the tapered recess is provided with a positioning recessed ring correspondingly, and the positioning protruding ring is correspondingly fit into the positioning recessed ring.

27. The hinge assembly as claimed in claim 23, wherein the pen tip end of the touch pen has a positioning rib disposed along a radial direction of the touch pen, the tapered recess is provided with a positioning recess correspondingly, and the positioning rib is correspondingly fit into the positioning recess.

28. The hinge assembly as claimed in claim 22, wherein the second accommodating groove further comprises a plurality of support rings for supporting the touch pen.

29. The hinge assembly as claimed in claim 22, wherein the touch pen comprises:
a touch sensor, disposed inside a pen body of the touch pen to sense an axial input along an axial direction of the touch pen; and
a pressure sensor, disposed inside the pen body to sense a radial input along a radial direction of the touch pen.

30. The hinge assembly as claimed in claim 29, wherein the pressure sensor and the touch sensor are disposed to be stacked.

31. The hinge assembly as claimed in claim 29, wherein the touch pen comprises:
a slidable tube, sleeved on the pen body.

32. The hinge assembly as claimed in claim 31, wherein when the touch pen is inserted into an external electronic device, the slidable tube slides to a position at the pen tip end or a position at the pen rear end.

33. The hinge assembly as claimed in claim 32, wherein when the touch pen is retrieved from the external electronic device, the slidable tube slides to a position corresponding to the touch sensor or corresponding to the pressure sensor.

34. The hinge assembly as claimed in claim 29, wherein the touch pen comprises a wireless communicating element disposed inside the pen body and serving for wireless communication with another external electronic device.

35. The hinge assembly as claimed in claim 34, wherein when the touch sensor senses axial inputs twice and the pressure sensor senses radial inputs twice, the wireless communicating element generates a command for turning on an user interface or a command for turning off the user interface, and transmits the generated command to the another external electronic device.

36. The hinge assembly as claimed in claim 34, wherein when the touch sensor senses an axial input toward the pen rear end and the pressure sensor senses a continuous radial input, the wireless communicating element generates a command for sliding down in an user interface or a command for moving up a choice in the user interface and transmits the generated command to the another external electronic device.

37. The hinge assembly as claimed in claim 34, wherein when the touch sensor senses an axial input toward the pen tip end and the pressure sensor senses a continuous radial input, the wireless communicating element generates a command for sliding up in an user interface or a command for moving down a choice in the user interface and transmits the generated command to the another external electronic device.

38. The hinge assembly as claimed in claim 34, wherein when the touch sensor senses the axial input once and the pressure sensor senses the radial input once, the wireless communicating element generates a command for confirmation and transmits the generated command to the another external electronic device.

39. The hinge assembly as claimed in claim 34, wherein when the touch sensor senses no axial input and the pressure sensor senses a continuous radial input, the wireless communicating element generates a command for drawing a line and transmits the generated command to the another external electronic device.

40. The hinge assembly as claimed in claim 39, wherein the command for drawing a line comprises a command on line thickness, and the command on line thickness is positively proportional to a magnitude of a value of the sensed continuous radial input.

41. The hinge assembly as claimed in claim 39, wherein when the another external electronic device is a head-mounted electronic device, the command for drawing a line is a command for drawing a spatial line.

42. The hinge assembly as claimed in claim 39, wherein the another external electronic device comprises an augmented reality device, a virtual reality device, or a mixed reality device.

* * * * *